(12) United States Patent
Chen et al.

(10) Patent No.: US 11,722,287 B2
(45) Date of Patent: Aug. 8, 2023

(54) FLEXIBLE TIME DIVISION DUPLEXING SUBFRAME STRUCTURE WITH LATENCY REDUCTION

(71) Applicant: QUALCOMM Incorporated, San Diego, CA (US)

(72) Inventors: Wanshi Chen, San Diego, CA (US); Shimman Arvind Patel, San Diego, CA (US); Aleksandar Damnjanovic, Del Mar, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 780 days.

(21) Appl. No.: 15/189,971

(22) Filed: Jun. 22, 2016

(65) Prior Publication Data
US 2017/0063514 A1 Mar. 2, 2017

Related U.S. Application Data

(60) Provisional application No. 62/231,520, filed on Sep. 2, 2015.

(51) Int. Cl.
*H04L 5/14* (2006.01)
*H04L 1/18* (2006.01)
(Continued)

(52) U.S. Cl.
CPC ............. *H04L 5/14* (2013.01); *H04L 1/1812* (2013.01); *H04L 5/1469* (2013.01);
(Continued)

(58) Field of Classification Search
CPC ........................................................ H04L 5/14
(Continued)

(56) References Cited

U.S. PATENT DOCUMENTS

| 9,930,678 B2 | 3/2018 | Kumar et al. |
| 2012/0023023 A1 | 1/2012 | Hicks et al. |

(Continued)

FOREIGN PATENT DOCUMENTS

| CN | 103297205 A | 9/2013 |
| CN | 103416011 A | 11/2013 |

(Continued)

OTHER PUBLICATIONS

ISA/EP, International Search Report and Written Opinion of the International Searching Authority, Int'l Application No. PCT/US2016/044274, dated Oct. 12, 2016, European Patent Office, Rijswijk, NL, 12 pgs.

*Primary Examiner* — Abdeltif Ajid
(74) *Attorney, Agent, or Firm* — Holland & Hart LLP

(57) ABSTRACT

Methods, systems, and devices for wireless communication are described. A wireless device may identify multiple regions within a subframe, such as one or more uplink regions, one or more downlink regions, and a guard region. The wireless device may identify and communicate during each region based on a timing relationship between the downlink region and the uplink region. For example, the device may expect hybrid automated repeat request (HARQ) feedback for one downlink region in the same subframe based on the proximity to the next uplink region. Another downlink region may not have HARQ feedback in the same subframe. Similarly, uplink regions may or may not be scheduled within the same subframe.

30 Claims, 17 Drawing Sheets

(51) Int. Cl.
*H04W 72/04* (2009.01)
*H04W 76/27* (2018.01)
*H04W 88/02* (2009.01)
*H04L 5/00* (2006.01)
*H04L 1/1812* (2023.01)
*H04W 72/20* (2023.01)

(52) U.S. Cl.
CPC ........... *H04W 72/20* (2023.01); *H04W 76/27* (2018.02); *H04L 5/0092* (2013.01); *H04W 88/02* (2013.01)

(58) Field of Classification Search
USPC ........................................................ 370/329
See application file for complete search history.

(56) References Cited

U.S. PATENT DOCUMENTS

| 2012/0230232 | A1* | 9/2012 | Ji | H04L 5/0092 370/280 |
| 2013/0286902 | A1 | 10/2013 | Chen et al. | |
| 2014/0092880 | A1* | 4/2014 | Wang | H04L 43/0864 370/336 |
| 2014/0293842 | A1 | 10/2014 | He et al. | |
| 2016/0020891 | A1* | 1/2016 | Jung | H04L 5/1469 370/280 |
| 2018/0213529 | A1* | 7/2018 | Lee | H04W 72/0446 |

FOREIGN PATENT DOCUMENTS

| EP | 1209938 A1 | 5/2002 |
| KR | 20120130405 A | 12/2012 |
| WO | WO-2009097806 A1 | 8/2009 |
| WO | WO-2014015266 | 1/2014 |
| WO | WO-2015042870 A1 | 4/2015 |
| WO | WO-2017014435 A1 | 1/2017 |

* cited by examiner

FLEXIBLE TIME DIVISION DUPLEXING SUBFRAME STRUCTURE WITH LATENCY REDUCTION

CROSS REFERENCES

The present application for patent claims priority to U.S. Provisional Patent Application No. 62/213,520, entitled "FLEXIBLE TIME DIVISION DUPLEXING SUBFRAME STRUCTURE WITH LATENCY REDUCTION," filed Sep. 2, 2015, assigned to the assignee hereof.

BACKGROUND

The following relates generally to wireless communication and more specifically to flexible time division duplexing (TDD) subframe structure with latency reduction.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include CDMA systems, TDMA systems, FDMA systems, and OFDMA systems. A wireless multiple-access communications system may include a number of base stations, each simultaneously supporting communication for multiple communication devices, which may be otherwise known as a user equipment (UE).

These multiple access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology.

In some cases, a wireless system, including an LTE system, may support low latency operations using transmission time intervals (TTI) or subframes of different durations. For instance, TTIs of one duration may be employed for communications that are not latency sensitive, while shorter duration TTIs may be used for latency sensitive communications. In some cases, control signaling for non-low latency communications may not be sufficient for low latency communications. This may result in communication delays and disruptions.

SUMMARY

A wireless communications system may be configured with transmission time intervals (TTIs), such as a subframe, that include shorter duration TTIs that each support uplink or downlink communications. Thus, rather than communicating in either the uplink or downlink direction for the duration of a subframe, for example, a wireless device may transmit and receive during the duration of the subframe. Control signaling between the various regions of a subframe may support low latency communications.

A wireless device, such as a user equipment (UE) or base station, may identify multiple regions within a subframe, such as one or more uplink regions, one or more downlink regions, and a guard region. The wireless device may identify and communicate during each region based on a timing relationship between the downlink region and the uplink region. For example, the device may expect hybrid automated repeat request (HARQ) feedback for one downlink region in a subframe based on the relationship to the next uplink region the same subframe. Another downlink region may not have HARQ feedback in the same subframe. Similarly, uplink regions may or may not be scheduled within the same subframe.

A method of wireless communication is described. The method may include identifying a downlink (DL) region of a subframe, wherein the subframe comprises the DL region, an uplink (UL) region, a guard region, and an additional region, identifying the UL region of the subframe, wherein a transmission on resources of the UL region is based at least in part on a timing relationship between the DL region and the UL region, and communicating during the DL region and the UL region according to the timing relationship.

An apparatus for wireless communication is described. The apparatus may include means for identifying a downlink (DL) region of a subframe, wherein the subframe comprises the DL region, an uplink (UL) region, a guard region, and an additional region, means for identifying the UL region of the subframe, wherein a transmission on resources of the UL region is based at least in part on a timing relationship between the DL region and the UL region, and means for communicating during the DL region and the UL region according to the timing relationship.

Another apparatus for wireless communication is described. The apparatus may include a processor, memory in electronic communication with the processor, and instructions stored in the memory. The instructions may be operable to cause the processor to identify a downlink (DL) region of a subframe, wherein the subframe comprises the DL region, an uplink (UL) region, a guard region, and an additional region, identify the UL region of the subframe, wherein a transmission on resources of the UL region is based at least in part on a timing relationship between the DL region and the UL region, and communicate during the DL region and the UL region according to the timing relationship.

A non-transitory computer readable medium for wireless communication is described. The non-transitory computer-readable medium may include instructions operable to cause a processor to identify a downlink (DL) region of a subframe, wherein the subframe comprises the DL region, an uplink (UL) region, a guard region, and an additional region, identify the UL region of the subframe, wherein a transmission on resources of the UL region is based at least in part on a timing relationship between the DL region and the UL region, and communicate during the DL region and the UL region according to the timing relationship.

Some examples of the method, apparatus, and non-transitory computer-readable medium described above may further include processes, features, means, or instructions for identifying the additional region of the subframe, wherein the additional region comprises an additional DL region or an additional UL region.

In some examples of the method, apparatus, and non-transitory computer-readable medium described above, a transmission on resources of the additional region may be based at least in part on a timing relationship between the DL region or the UL region and the additional region.

Some examples of the method, apparatus, and non-transitory computer-readable medium described above may further include processes, features, means, or instructions for receiving a DL control message during the DL region.

Some examples of the method, apparatus, and non-transitory computer-readable medium described above may further include processes, features, means, or instructions for receiving DL data during the DL region, wherein resources of the DL region may be scheduled by the DL control message.

Some examples of the method, apparatus, and non-transitory computer-readable medium described above may further include processes, features, means, or instructions for transmitting an UL control message during the UL region, wherein the UL control message comprises acknowledgment (ACK) information for the DL data received during the DL region.

Some examples of the method, apparatus, and non-transitory computer-readable medium described above may further include processes, features, means, or instructions for receiving DL data during the additional region, wherein the additional region follows the DL region and precedes the UL region, and wherein the additional region comprises an additional DL region comprising resources scheduled by the DL control message.

Some examples of the method, apparatus, and non-transitory computer-readable medium described above may further include processes, features, means, or instructions for transmitting an UL control message during a subsequent subframe, wherein the UL control message comprises acknowledgment (ACK) information for the DL data received during the additional DL region.

Some examples of the method, apparatus, and non-transitory computer-readable medium described above may further include processes, features, means, or instructions for transmitting UL data or an UL control message, or both, during the UL region, wherein the resources of the UL region may be scheduled by the DL control message.

Some examples of the method, apparatus, and non-transitory computer-readable medium described above may further include processes, features, means, or instructions for transmitting UL data or an UL control message, or both, during the additional region, wherein the additional region follows the DL region and precedes the UL region, and wherein the additional region comprises an additional UL region comprising resources scheduled by another DL control message in a preceding subframe.

In some examples of the method, apparatus, and non-transitory computer-readable medium described above, the timing relationship between the DL region and the UL region may be based at least in part on a capability of a user equipment (UE) scheduled for communication during the subframe or a serving cell that schedules communications during the subframe, or both.

In some examples of the method, apparatus, and non-transitory computer-readable medium described above, the timing relationship between the DL region and the UL region may be identified using a system information (SI) broadcast, radio resource control (RRC) signaling, or a grant of resources in a DL control message, or any combination thereof.

In some examples of the method, apparatus, and non-transitory computer-readable medium described above, the timing relationship between the DL region and the UL region comprises a minimum time duration used for subframes having separate regions for UL and DL communications, and wherein a first duration of the DL region and a second duration of the UL region may be based at least in part on the minimum time duration.

Some examples of the method, apparatus, and non-transitory computer-readable medium described above may further include processes, features, means, or instructions for identifying the guard region of the subframe, wherein the timing relationship between the DL region and the UL region may be based at least in part on a location of the guard region within the subframe or a duration of the guard region, or both.

In some examples of the method, apparatus, and non-transitory computer-readable medium described above, the duration of the guard region of the subframe may be different from a guard period of a special subframe of a time division duplex (TDD) configured carrier, wherein the TDD configured carrier comprises the subframe and the special subframe.

In some examples of the method, apparatus, and non-transitory computer-readable medium described above, the guard period of the special subframe may be configured according to a common capability of each user equipment (UE) in a set of UEs within a system, and wherein the guard region of the subframe may be configured according to a different capability of a subset of the set of UEs within the system.

In some examples of the method, apparatus, and non-transitory computer-readable medium described above, a DL hybrid automatic repeat request (HARQ) timing or a UL scheduling timing, or both, for the subframe may be different from a DL HARQ timing or a UL scheduling timing for a subsequent subframe or a preceding subframe.

DETAILED DESCRIPTION

Some wireless systems may utilize low latency operations in which transmission time intervals (TTIs) support communications with a reduced duration compared with other TTIs in the system or TTIs of certain legacy systems. In some cases, low latency operation may result in a significant over-the-air latency reduction. The subframe structure for time division duplexing (TDD) communications may take on various configurations in such low latency systems. For instance, as described herein, some TTIs (e.g., a subframe) may include both uplink (UL) and downlink (DL) regions so that latency reductions may be realized by increasing the frequency of transmissions between a user equipment (UE) and a base station during the duration of one TTI of the system.

By way of example, in one TDD subframe there may be a downlink (DL) portion or region carrying communication data or control information, a guard period, and an uplink (UL) portion or region carrying uplink control information. Alternately, a TDD subframe may include a DL portion carrying control information (e.g., scheduling information for UL communications), a guard period, and an UL portion carrying UL data or control information, or both data and control. These subframe structures may be further partitioned for improved latency reduction, particularly as it relates to efficient handling of UL scheduling and hybrid automatic repeat request (HARQ) processes.

In some cases, two or more regions may be defined within the subframe, such that multiple regions may expect HARQ feedback or UL scheduling within the same subframe. This may enable region-dependent HARQ feedback or UL scheduling, or both. For example, and as explained in detail below, when a UE has HARQ feedback for transmissions received in two different regions of a subframe, the UE may transmit HARQ feedback for transmissions received in one region during the subframe that includes the region, and the UE may transmit HARQ feedback for transmissions received during the second region in a subsequent subframe. So a portion of the subframe may support low latency operation with respect to HARQ feedback. Similarly, a subframe may include two different UL regions, one of which may be scheduled by a DL control message received during the subframe and the other may be scheduled by control information received during a previous subframe. So a portion of the subframe may support low latency operation with respect to UL scheduling.

Aspects of the disclosure introduced above are further described below in the context of a wireless communication system. Specific examples are then described for flexible subframe configurations that may be for low latency communication. These and other aspects of the disclosure are further illustrated by and described with reference to apparatus diagrams, system diagrams, and flowcharts that relate to flexible TDD subframe structure with latency reduction.

Figure 1:
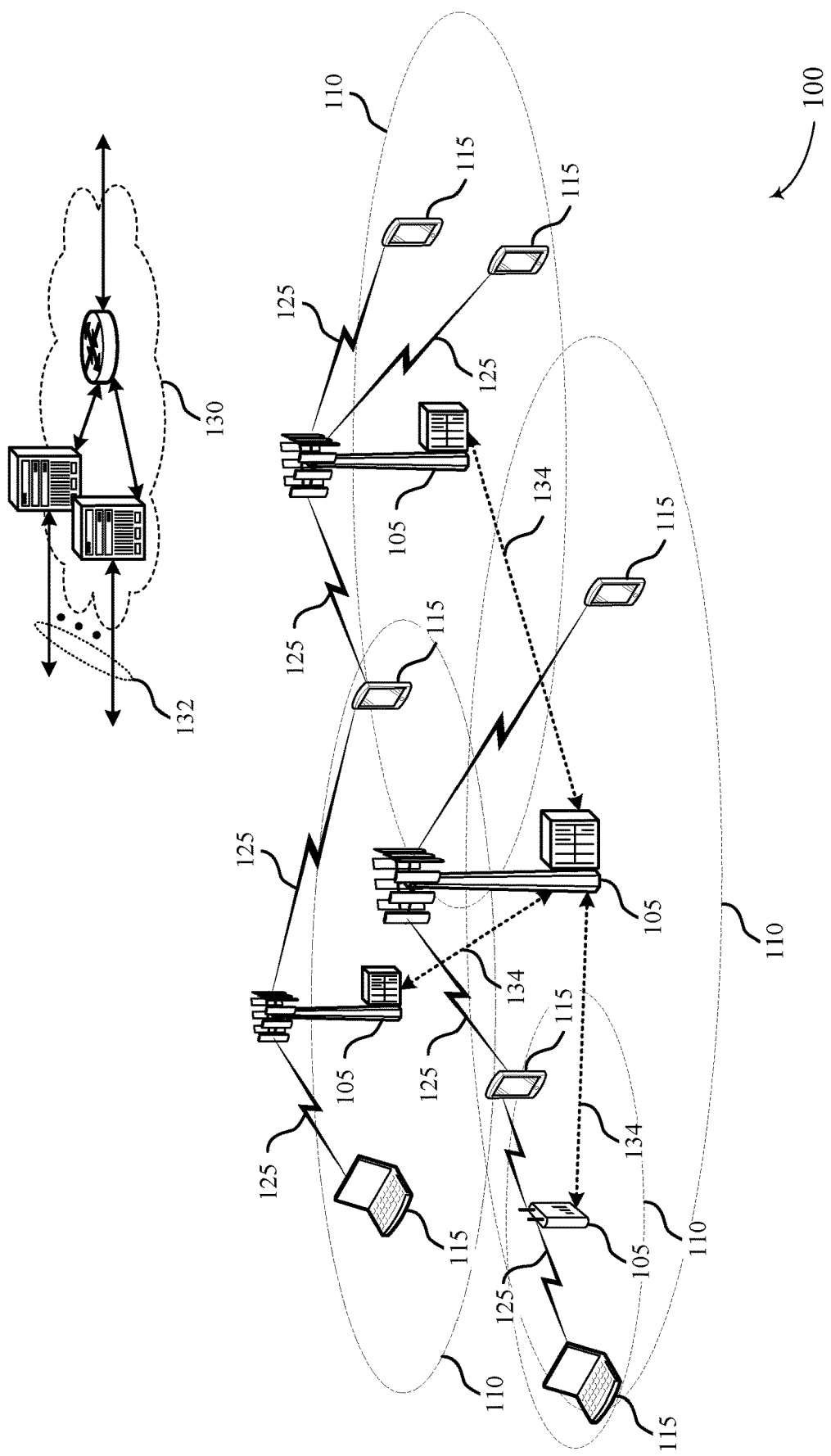
FIG. 1 illustrates an example of a wireless communications system that supports flexible time division duplexing (TDD) subframe structure with latency reduction in accordance with aspects of the present disclosure.

FIG. 1 illustrates an example of a wireless communications system 100 in accordance with various aspects of the present disclosure. The wireless communications system 100 includes base station 105, UEs 115, and a core network 130. In some examples, the wireless communications system 100 may be a Long Term Evolution (LTE)/LTE-Advanced (LTE-A) network. Wireless communications system 100 may support flexible subframe configurations for low latency communication and may use subframes that include additional regions to support HARQ feedback and scheduling within the same subframe.

Base station 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or DL transmissions, from a base station 105 to a UE 115. UEs 115 may be dispersed throughout the wireless communications system 100, and each UE 115 may be stationary or mobile. A UE 115 may also be referred to as a mobile STA, a subscriber STA, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine type communication (MTC) device or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (evolved node Bs (eNBs)) 105.

In some cases, wireless communications system 100 may utilize one or more enhanced component carriers (eCCs). An eCC may be characterized by one or more features including: flexible bandwidth, different TTIs, and modified control channel configuration. In some cases, an eCC may be associated with a CA configuration or a dual connectivity configuration (e.g., when multiple serving cells have a suboptimal backhaul link). An eCC may also be configured for use in unlicensed spectrum or shared spectrum (e.g., where more than one operator is licensed to use the spectrum). An eCC characterized by flexible bandwidth may include one or more segments that may be utilized by UEs 115 that are not capable of monitoring the whole bandwidth or prefer to use a limited bandwidth (e.g., to conserve power). In some cases, an eCC may utilize TDD configurations that include subframes having multiple UL and DL regions to support low latency communication.

In some examples, an eCC may include multiple hierarchical layers associated with the different TTI lengths. For example, TTIs at one hierarchical layer may correspond to uniform 1 ms subframes, whereas in a second layer, variable length TTIs may correspond to bursts of short duration symbol periods. In some cases, a shorter symbol duration may also be associated with increased subcarrier spacing. In conjunction with the reduced TTI length, an eCC may utilize dynamic TDD operation (i.e., it may switch from DL to UL operation for short bursts according to dynamic conditions). Flexible bandwidth and variable TTIs may be associated with a modified control channel configuration (e.g., an eCC may utilize an enhanced physical downlink control channel (ePDCCH) for DL control information). For example, one or more control channels of an eCC may utilize frequency-division multiplexing (FDM) scheduling to accommodate flexible bandwidth use. Other control channel modifications include the use of additional control channels (e.g., for eMBMS scheduling, or to indicate the length of variable length UL and DL bursts), or control channels transmitted at different intervals. An eCC may also include modified or additional HARQ related control information.

The wireless communications system 100 may utilize hybrid automatic repeat request (HARQ) to improve the reliability of wireless communications. That is, HARQ may be a method of ensuring that data is received correctly over a wireless communication link 125. HARQ may include a combination of error detection (e.g., using a CRC), FEC, and retransmission (e.g., automatic repeat request (ARQ)). HARQ may improve throughput at the MAC layer in poor radio conditions (e.g., signal-to-noise conditions). In Incremental Redundancy HARQ, incorrectly received data may be stored in a buffer and combined with subsequent transmissions to improve the overall likelihood of successfully decoding the data. In some cases, redundancy bits are added to each message prior to transmission. This may be useful in poor conditions. In other cases, redundancy bits are not added to each transmission, but are retransmitted after the transmitter of the original message receives a NACK indicating a failed attempt to decode the information.

Carriers may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined. For TDD frame structures, each subframe may carry UL or DL traffic, special subframes may be used to switch between DL and UL transmission, and subframes that support low latency communication (e.g., subframes that include both UL and DL regions) may support both UL and DL communications in the duration of one subframe. Allocation of UL and DL subframes within radio frames may be symmetric or asymmetric and may be statically determined or may be reconfigured semi-statically. Special subframes may carry DL or UL traffic and may include a Guard Period (GP) between DL and UL traffic. TDD-configured carriers within wireless communications system 100 may include both special subframes and subframes that support low latency communication.

In some cases, switching from UL to DL traffic may be achieved by setting a timing advance at the UE 115 without the use of special subframes or a guard period. UL-DL configurations with switch-point periodicity equal to the frame period (e.g., 10 ms) or half of the frame period (e.g., 5 ms) may also be supported. For example, TDD frames may include one or more special frames, and the period between special frames may determine the TDD DL-to-UL switch-point periodicity for the frame. Use of TDD offers flexible deployments that may be used without paired UL-DL spectrum resources. In some TDD network deployments, interference may be caused between UL and DL communications (e.g., interference between UL and DL communication from different base stations, interference between UL and DL communications from base stations and UEs, etc.). For example, where different base stations 105 serve different UEs 115 within overlapping coverage areas according to different TDD UL-DL configurations, a UE 115 attempting to receive and decode a DL transmission from a serving base station 105 can experience interference from UL transmissions from other, proximately located UEs 115. In some cases, subframes that support low latency communication may have, in addition to UL and DL regions, a guard region to support switching between regions. As discussed below, guard regions of these low latency subframes may be different from a GP of special subframe.

A UE 115 or base station 105 may utilize a variety of configurations within a subframe to improve efficiency in low latency. A UE 115 or base station 105 may identify multiple regions within a subframe, such as one or more UL regions, one or more DL regions, and a guard region. The UE 115 or base station 105 may identify and communicate during each region based on a timing relationship between the DL region and the UL region. For example, the UE 115 or base station 105 may expect hybrid automated repeat request (HARQ) feedback for one DL region in the same subframe based on the relationship to the next UL region. Similarly, UL regions may or may not be scheduled within the same subframe.

Figure 2:
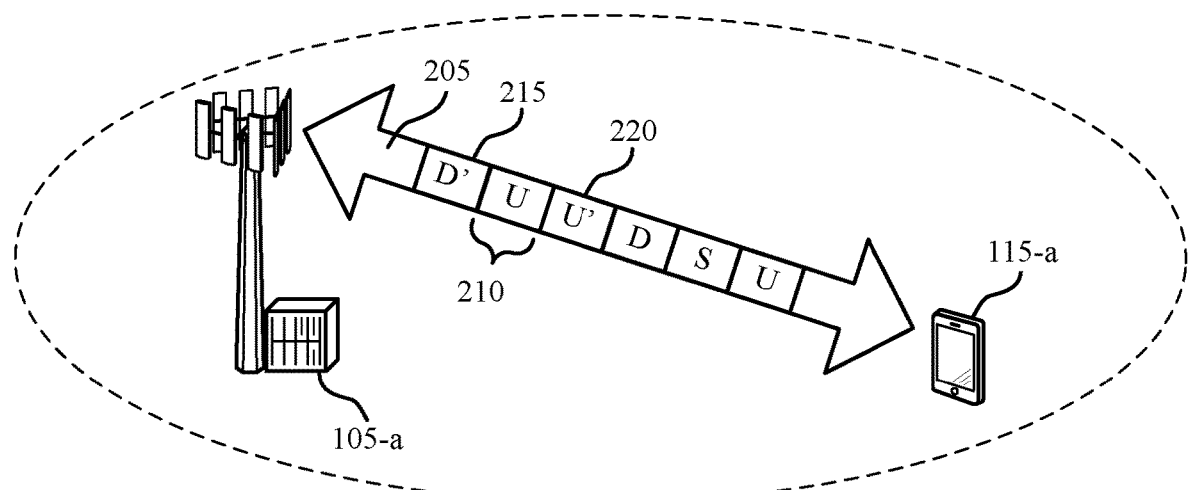
FIG. 2 illustrates an example of a wireless communications system that supports flexible TDD subframe structure with latency reduction in accordance with aspects of the present disclosure.

FIG. 2 illustrates an example of a wireless communications system 200 that supports flexible TDD subframe structure with latency reduction. Wireless communications system 200 may include base station 105-*a* and UE 115-*a*, which may be examples of the corresponding devices described with reference to FIG. 1. UE 115-*a* may communicate with base station 105-*a* through TDD communication link 205, where both uplink and downlink control and data may be transmitted within TTIs of the same subframe 210. As described herein, subframes 210 may have a flexible TTI configuration to allow low latency communications.

Wireless communications system 200 may use a reduced or variable TTI duration to reduce latency between DL and UL transmissions. For example, in some wireless systems, a HARQ response time may take as long as 4 ms, whereas some low latency systems may complete HARQ in hundreds of microseconds. In some cases, a low latency TTI may correspond to one LTE symbol period or approximately 71 μs for normal cyclic prefix (CP) and approximately 83 μs for extended CP. However, other TTI lengths are possible (e.g., two LTE symbol periods, 1 slot, etc.). In some reduced latency configurations, a subframe may include both UL and DL regions.

Based on the potential for both UL and DL TTIs within a subframe, and because the transmission direction may be dynamically scheduled by base station 105-*a*, a UE 115-*a* may not be aware of whether an upcoming TTI is going to be an UL TTI or a DL TTI. Thus, in some examples UE 115-*a* may monitor each TTI as if it might contain a DL control or data transmission; and UE 115-*a* may check that assumption against implicit or explicit signaling. For example, UE 115-*a* or base station 105-*b* may receive a grant and determine—e.g., based on HARQ timing (for a DL grant) or UL scheduling timing (for an UL grant)—that a subsequent TTI is an UL TTI. Additionally or alternatively, UE 115-*a* or base station 105-*a* may receive explicit signaling of the transmission direction at a predetermined time period prior to a given TTI. In some cases, if UE 115-*a* determines that a TTI is an UL TTI, based on either explicit or implicit signaling, UE 115-*a* may refrain from monitoring during the TTI in order to conserve power (or, in some cases, it may transmit UL data).

In some cases, communication using TDD may be associated with several UL/DL configurations of TDD subframes 210, which may be designated as UL, DL, or special (or U' or D', as described below). Multiple switching periodicities (i.e., 5 ms and 10 ms) may also be associated with each of the subframe configurations, where each periodicity is associated with a different number of special subframes. For example, a 5 ms switch-point periodicity is associated with two special subframes in one frame, and a 10 ms switch-point periodicity corresponds to one special subframe in a frame. As shown in Table 1, an example of the relationships between various uplink/downlink configurations and downlink-to-uplink switch-point periodicity is provided.

TABLE 1

| Uplink-Downlink Configuration | Downlink-to-Uplink Switch-point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Due to backward compatibility constraints and certain TDD DL or UL subframe configurations, supporting low latency under TDD may utilize additional control signaling or implicit control conventions. Subframe configurations may be indicated with, for instance, a system information broadcast (e.g., system information block Type 1 (SIB 1)). Certain UEs may recognize and use DL and UL subframes 210 as subframes that support low latency operation while others recognize a non-low latency configuration. Subframe configurations may be subject to cell-specific reference signal (CRS) symbols, guard periods (GP), or control regions for other network operation. Although, CRS may not be present in certain subframe types, e.g., multi-broadcast single-frequency network (MBSFN) subframes, such subframes may still be used for low latency operation. In some cases, UL subframes or special subframes may provide additional flexibility for DL/UL low latency arrangements.

The TDD subframe structure may take on different configurations. For example, a primarily downlink subframe 215, denoted as D', can include a downlink portion carrying communication data or control information, a guard period, and an uplink portion carrying uplink control information. Alternately, a primarily uplink subframe 220, denoted as U', may include a downlink portion carrying control information (e.g., scheduling information for UL communications), a guard period, and an uplink portion carrying UL data or control information.

In some wireless communications systems using TDD, DL, special, or UL subframes supporting low latency may contain control information and data for DL and UL. Additionally, the D' and U' subframe structures discussed herein may focus on DL or UL data in each subframe, respectively. In some cases, the DL data transmitted as a single transport block in D' may not have HARQ feedback in the UL portion of the same subframe. Similarly, the UL data transmitted as a single transport block in U' may not be scheduled by the DL portion of the same subframe.

Thus, for the D' and U' subframes, two or more regions can be identified such that UE 115-*a* or base station 105-*a* can expect HARQ feedback or UL scheduling within the same subframe, while one or more of the regions may not support HARQ feedback (or UL scheduling) in the same subframe. That is, there may be region-dependent HARQ feedback or UL scheduling within the subframe. For example, when two DL data or control regions are defined in a D' subframe configuration, the first region has same-subframe HARQ feedback, and the second region has HARQ feedback in a subsequent subframe. In some cases, the second region may have DL data without DL control (e.g., the first region may carry all control data). Two UL data/control regions may also be defined within a U' subframe configuration, where the first region may not have same-subframe scheduling, but UL scheduling may be done within the same subframe for the second region.

With a flexible subframe structure that supports latency reduction, various partitioning schemes may be used for different applications. For example, the partitioning of the regions of a subframe may be cell-specific or UE-specific. That is, some UEs 115 may have different capabilities and, in some cases, the duration from the end of the DL region until the beginning of the UL region may be shorter to accommodate UEs 115 with greater processing capabilities. The partitioning of regions may also be semi-static (e.g., indicated by a SIB or RRC signaling) and may also be implicit (e.g., a minimum gap between the end of the DL region and beginning of the UL region can be specified, allowing for same-subframe scheduling/HARQ feedback performed, and regions may be implicitly derived). Additionally, a UE may be scheduled with one or more regions of the subframe. For example, in the two-region example discussed above, a UE may be scheduled with the first region, the second region, or both regions. Additionally, a region within a subframe may also be dependent on the duration of the guard period. That is, if the guard period is large enough, all regions may have same-subframe scheduling or HARQ feedback, and region dependent timing may be unnecessary.

In some cases, there may be guard period management within the subframe. For example, the duration of a guard period in a DL or UL subframe may be different from the guard period in a special subframe of the TDD DL/UL subframe configuration. That is, the guard period in the special subframe may be primarily used for all UEs 115 communicating in the cell, where the guard period in the D' or U' subframes may be primarily used for a group of UEs 115 in the cell. In some cases, the duration of the guard period in the D' subframe may be different from the guard period in the U' subframe. The DL HARQ timing can also be different from UL scheduling timing (e.g., four symbols for DL HARQ timing and two symbols for UL scheduling/timing). Different regions of a TTI may also have different HARQ/scheduling timings across subframes. There may also be a flexible utilization of the D' and U' subframes, as D' and U' may have different UL region durations. It may also be beneficial to use the flexibility of the D' and U' subframes for link-budget limited UEs 115-*a*, such as using the UL portion in U' for UL control information transmission and a longer UL portion relative to that of D' can provide improved coverage.

Figure 3:
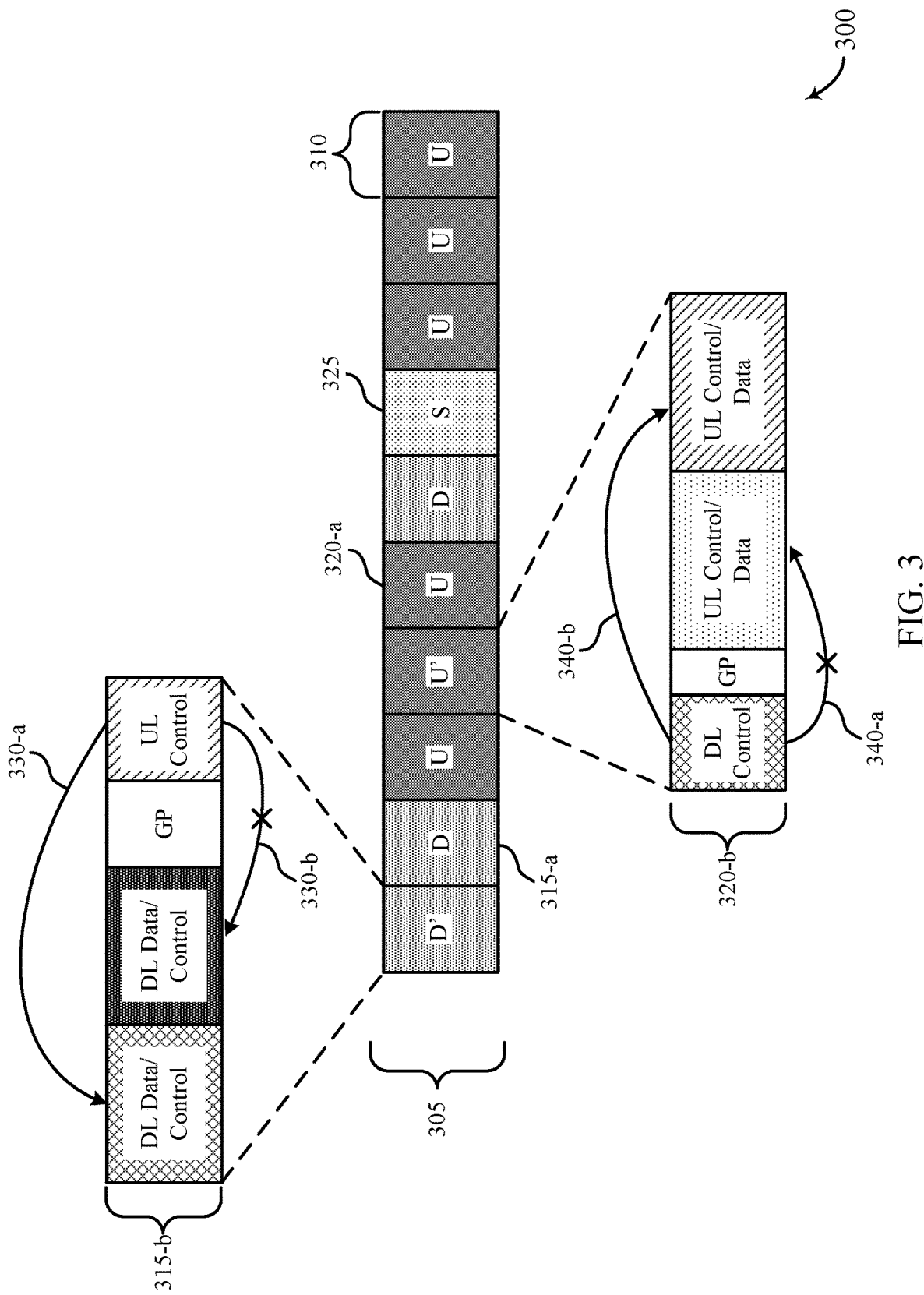
FIG. 3 illustrates an example of a frame configuration that supports flexible TDD subframe structure with latency reduction in accordance with aspects of the present disclosure.

FIG. 3 illustrates an example of an expanded view of a frame configuration 300 that supports flexible TDD subframe structure with latency reduction. In some cases, frame configuration 300 may represent aspects of techniques performed by a UE 115 or base station 105 as described with reference to FIGS. 1-2. Frame configuration 300 may include a frame 305, which may include a number of subframes 310 scheduled for DL or UL. In some cases, subframes 310 may be an example of TTIs as described with reference to FIG. 2. Frame 305 may illustrate a flexible subframe structure in a low latency communications system.

Frame 305 may include a number of downlink subframes 315-*a* and UL subframes 320-*a* that are configurable or otherwise support low latency operation. In some cases, frame 305 may include both subframes that support low latency operations and subframes which support uplink or downlink communications for traffic that is less sensitive to latency. The distribution of downlink subframes 315 and UL subframes 325 may be determined by a UE 115 or base station 105 according to predefined UL/downlink TDD configurations. Between the downlink subframes 315 and the UL subframes 320, the UE 115 or base station 105 may not schedule any information. Such scheduling gaps may allow a UE 115 to transition from a downlink setup to an UL setup. Thus, frame 305 may include special subframes 320 which act as guard periods for occasions when communication direction changes (e.g., from downlink to UL).

Subframes 310 may be partitioned into smaller segments—such as slots and symbols. Subframes 310 may also include different regions, such as a DL region, an additional region, a guard period, and an UL region. For example, in D' subframe 315-b, a first DL region, an additional DL region, a guard period, and an UL region may be configured. In some cases, the first DL region of the D' subframe 315-b may have a timing relationship (e.g., proximity to) an UL control region that supports HARQ feedback 330-a within the same subframe, and the second DL region may have a different timing relationship (e.g., proximity to) the UL control region that does not support HARQ feedback 330-b in the same subframe (but HARQ feedback for the second DL region may be transmitted in a subsequent subframe). In some cases, a subframe 310 may be partitioned into a U' subframe 320-b that includes a DL region, a guard period, a first UL region, and an additional UL region. In some examples, the first UL region may not have UL scheduling 340-a within the same U' subframe 320-b, but UL scheduling 340-b for the additional UL subframe region may be within the same subframe.

Figure 4:
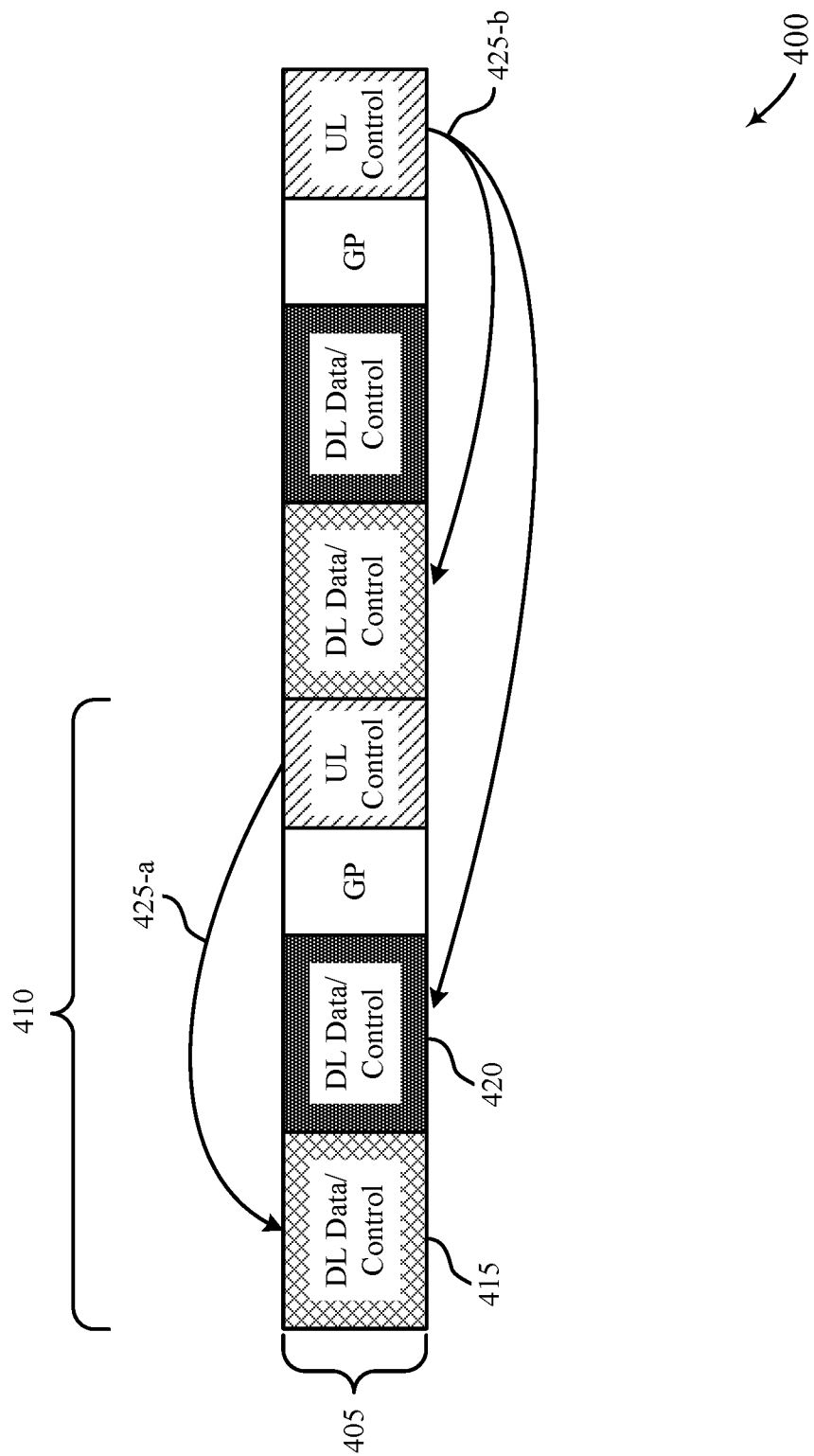
FIG. 4 illustrates an example of inter-subframe management that supports flexible TDD subframe structure with latency reduction in accordance with aspects of the present disclosure.

FIG. 4 illustrates an example of a frame configuration supporting inter-subframe scheduling 400 that supports flexible TDD subframe structure with latency reduction. In some cases, frame configuration supporting inter-subframe scheduling 400 may represent aspects of techniques performed by a UE 115 or base station 105 as described with reference to FIGS. 1-2. Frame configuration supporting inter-subframe scheduling 400 may include frame 405, which may include a number of subframes scheduled for DL or UL.

Frame 405 may include a number of subframes 410, which may be further partitioned into different regions, such as a DL region, an additional region, a guard period, and an UL region. In some cases, inter-frame management that supports flexible frame configurations for low latency may be used for regions within different subframes 410. For example, there may be HARQ feedback 425-a for a region 415 within the same subframe in addition to HARQ feedback 425-b for a region 420 in a different subframe. That is, different regions may have different HARQ (or scheduling) timings across different subframes 410.

Figure 5:
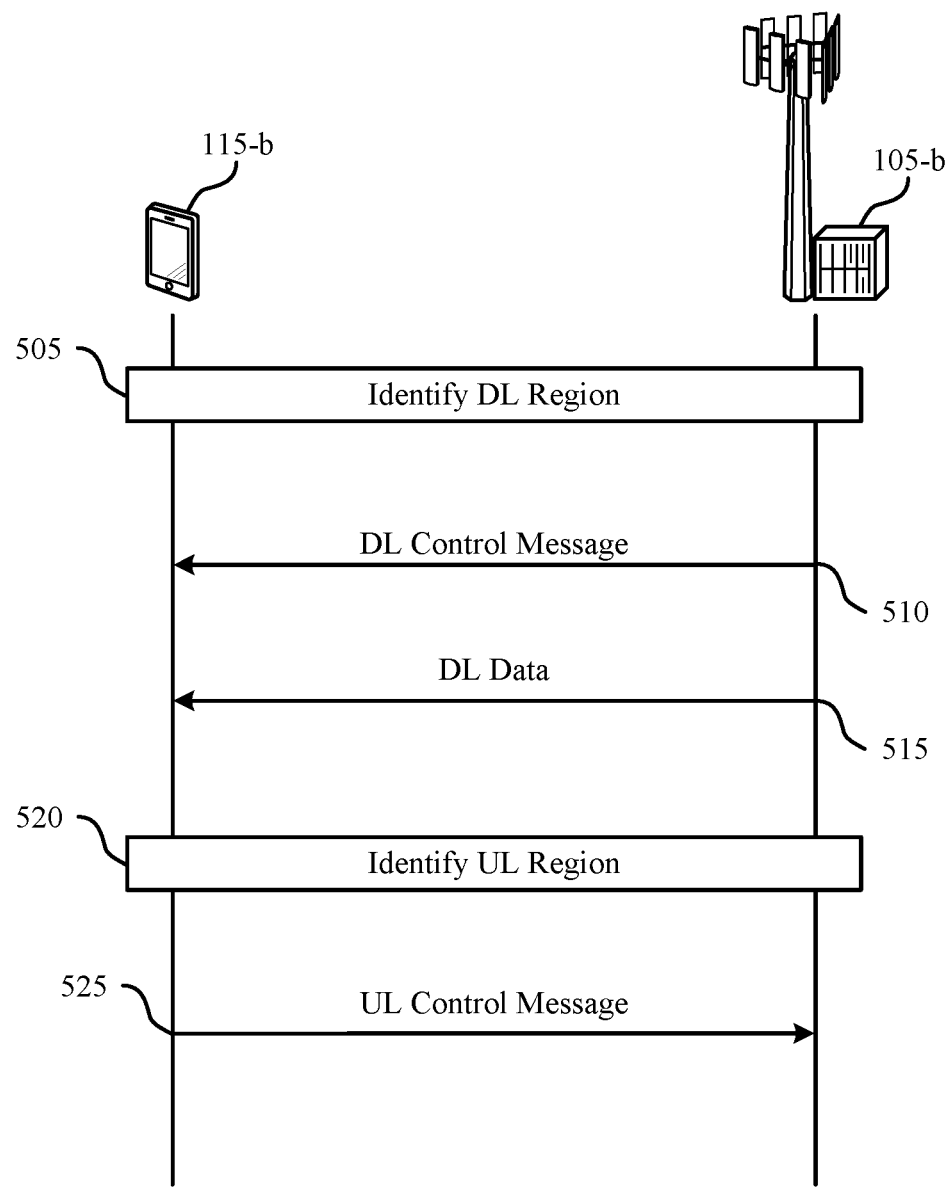
FIG. 5 illustrates an example of a process flow in a system that supports flexible TDD subframe structure with latency reduction in accordance with aspects of the present disclosure.

FIG. 5 illustrates an example of a process flow 500 that supports flexible TDD subframe structure with latency reduction in accordance with various aspects of the present disclosure. Process flow 500 may include base station 105-a and UE 115-a, which may be examples of the corresponding devices described with reference to FIG. 1-2.

At step 505, UE 115-b or base station 105-b may identify a DL region of a subframe, where the subframe includes the DL region, an UL region, a guard region, and an additional region. In some cases, UE 115-b or base station 105-b may identify the additional region of the subframe, where the additional region may be an additional DL region, and where a transmission on resources of the additional region may be based on a timing relationship between the DL region and the additional region. That is, in some examples, the timing relationship between the DL region and the UL region is based on a capability of a UE scheduled for communication during the subframe and a serving cell that schedules communications during the subframe.

In some cases, the timing relationship between the DL region and the UL region is identified using a system information broadcast or radio resource control (RRC) signaling, or a grant of resources in a DL control message, or any combination thereof. Additionally, the timing relationship between the DL region and the UL region may include a minimum time duration used for subframes having separate regions for UL and DL communications, and a first duration of the DL region and a second duration of the UL region may be based on the minimum time duration. In some cases, DL hybrid automatic repeat request (HARQ) timing or UL scheduling timing, or both, for the subframe are different from DL HARQ timing or UL scheduling timing for a subsequent subframe or a preceding subframe.

UE 115-b and base station 105-b may identify the guard region of the subframe, and the timing relationship between the DL region and the UL region may be based on a location of the guard region within the subframe or a duration of the guard region, or both. That is, the duration of the guard region of the subframe is different from a guard period of a special subframe of a time division duplex (TDD) configured carrier, and the TDD configured carrier may include the subframe and the special subframe.

In some examples, the guard period of the special subframe is configured according to a common capability of each user equipment (UE) in set of UEs, including UE 115-b, within a system, and the guard region of the subframe is configured according to a different capability of a subset of the set of UEs, including UE 115-b, within the system. In some cases, the duration of the guard region of the subframe (e.g., U' or D') is based on a first duration of the UL region relative to a second duration of the DL region and a third duration of the additional region, and DL hybrid automatic repeat request (HARD) timing and UL scheduling timing for the subframe may be based on the duration of the guard region of the subframe.

At step 510, base station 105-b may transmit and UE 115-b may receive the DL control message during the DL region. In some cases, transmitting the DL control message during the DL region may allow UE 115-b to transmit, and base station 105-b to receive, UL data or an UL control message, or both, during the UL region, and the resources of the UL region may be scheduled by the DL control message. In some examples, UE 115-b may transmit and base station 105-b may receive UL data or an UL control message, or both, during the additional region, where the additional region follows the DL region and precedes the UL region, and the additional region may include an additional UL region comprising resources scheduled by another DL control message in a preceding subframe.

At step 515, base station 105-b may transmit and UE 115-b may receive DL data during the DL region of a subframe; resources of the DL region may be scheduled by the DL control message. In some cases, base station 105-b may transmit and UE 115-b may receive the DL data during the DL region. The DL data may, for instance, include one transport block mapped to resources of the DL region and the additional DL region. In some examples, base station 105-b may transmit and UE 115-b may receive DL data during the additional region, and the additional region may follow the DL region and precede the UL region. The additional region may be an additional DL region with resources scheduled by the DL control message.

At step 520, UE 115-b or base station 105-b may identify the UL region of the subframe; a transmission on resources of the UL region may thus be based on a timing relationship between the DL region and the UL region. In some cases, UE 115-*b* or base station 105-*b* may identify the additional region of the subframe, and the additional region may include an additional UL region; a transmission on resources of the additional region may be based on a timing relationship between the UL region and the additional region.

In some cases, transmitting the DL control message during the DL region may allow UE 115-*b* to transmit UL data or an UL control message, or both, during the UL region. The resources of the UL region may, for instance, be scheduled by the DL control message. In some examples, UE 115-*b* may transmit UL data or an UL control message, or both, during the additional region, and the additional region may follow the DL region and precede the UL region. The additional region may be an additional UL region that includes resources scheduled by another DL control message in a preceding subframe.

At step 525, UE 115-*b* may transmit, and base station 105-*b* may receive, an UL control message during the UL region. The UL control message may include ACK information for the DL data received during the DL region. In some examples, UE 115-*b* may transmit and base station 105-*b* may receive an UL control message during a subsequent subframe, and the UL control message may include ACK information for the DL data received during the additional DL region.

Figure 6:
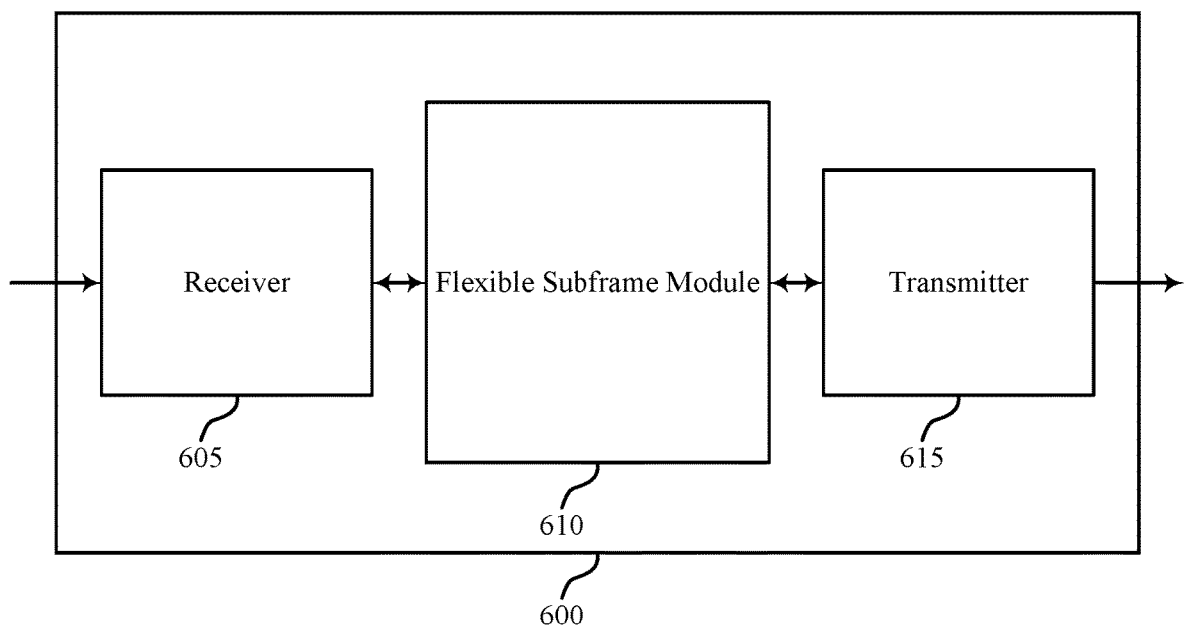
FIGS. 6 through 8 show block diagrams of a wireless device that supports flexible TDD subframe structure with latency reduction in accordance with aspects of the present disclosure.

FIG. 6 shows a block diagram of a wireless device 600 that supports flexible TDD subframe structure with latency reduction in accordance with various aspects of the present disclosure. Wireless device 600 may be an example of aspects of a UE 115 or base station 105 described with reference to FIGS. 1 and 2. Wireless device 600 may include receiver 605, flexible subframe module 610 and transmitter 615. Wireless device 600 may also include a processor. Each of these components may be in communication with one another. Wireless device 600 may also represent an example of a UE 115-*b* or a base station 105-*c* described with reference to FIGS. 9 and 10.

The receiver 605 may receive information such as packets, user data, or control information associated with various information channels (e.g., control channels, data channels, and information related to flexible TDD subframe structure with latency reduction, etc.). Information may be passed on to other components of the device. Receiver 605 may also represent examples of aspects of a transceiver 925 or transceiver 1025 described with reference to FIGS. 9 and 10.

The flexible subframe module 610 may identify a DL region of a subframe, which may include the DL region, an UL region, a guard region, and an additional region (e.g., an addition UL or DL region). The flexible subframe module may also identify the UL region of the subframe. As described above, a transmission on resources of the UL region may be based on a timing relationship between the DL region and the UL region. The flexible subframe module 610, in combination with receiver 605 or the transmitter 615, or both, may communicate during the DL region and the UL region according to the timing relationship of the subframe. The flexible subframe module 610 may be an aspect of a processor, such as the processor 910 or 1010 described with reference to FIGS. 9 and 10.

The transmitter 615 may, for instance, transmit signals received from other components of wireless device 600. In some examples, the transmitter 615 may be collocated with a receiver in a transceiver module. The transmitter 615 may include a single antenna, or it may include a plurality of antennas. Transmitter 615 may illustrate aspects of a transceiver 925 or transceiver 1025 described with reference to FIGS. 9 and 10.

Figure 7:
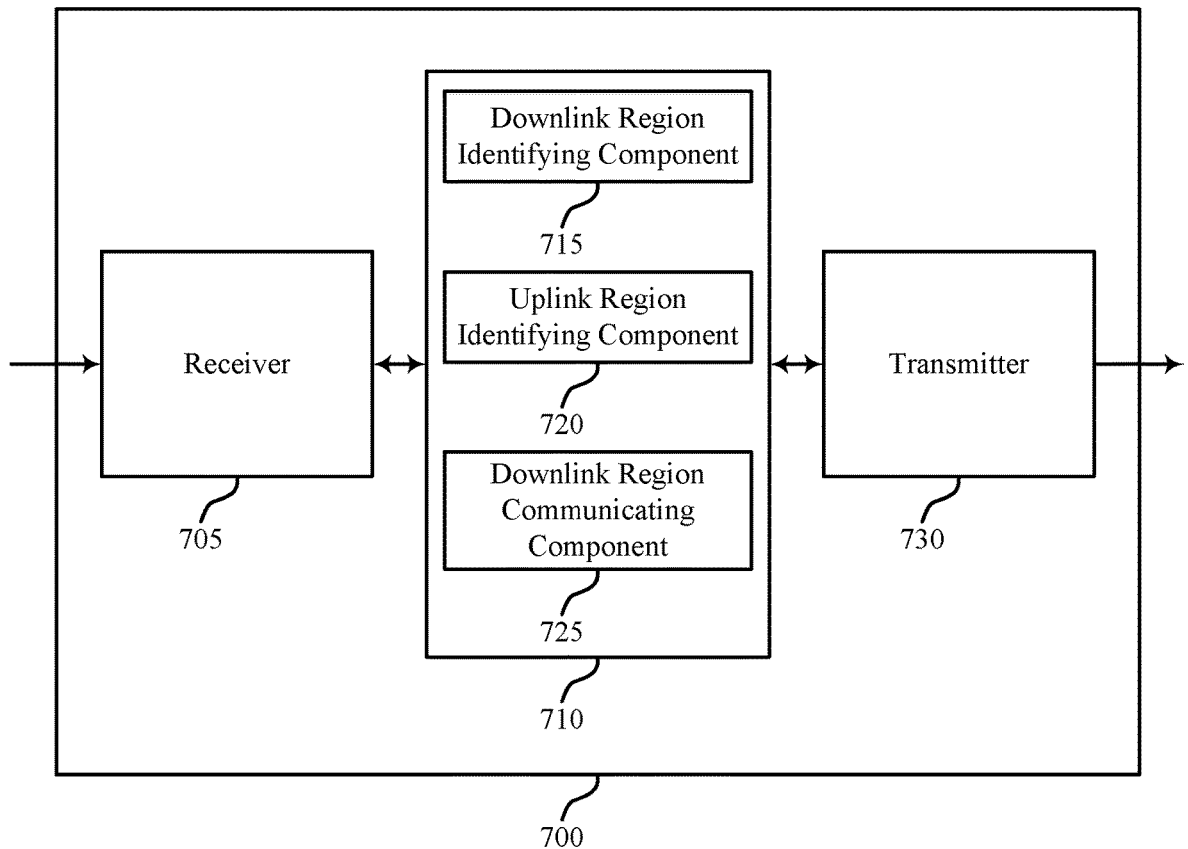

FIG. 7 shows a block diagram of a wireless device 700 that supports flexible TDD subframe structure with latency reduction in accordance with various aspects of the present disclosure. Wireless device 700 may be an example of aspects of a wireless device 600, a UE 115 or a base station 105 described with reference to FIGS. 1, 2 and 6. Wireless device 700 may include receiver 705, flexible subframe module 710 and transmitter 730. Wireless device 700 may also include a processor. Each of these components may be in communication with one another. Wireless device 700 may also represent an example of a UE 115-*b* or a base station 105-*c* described with reference to FIGS. 9 and 10.

The receiver 705 may receive information which may be passed on to other components of the device. The receiver 705 may also perform the functions described with reference to the receiver 705 of FIG. 6. Receiver 705 may illustrate aspects of a transceiver 925 or transceiver 1025 described with reference to FIGS. 9 and 10.

The flexible subframe module 710 may be an example of aspects of flexible subframe module 610 described with reference to FIG. 6. The flexible subframe module 710 may illustrate aspects of a processor, such as the processor 910 or 1010 described with reference to FIGS. 9 and 10. The flexible subframe module 710 may include DL region identifying component 715, uplink region identifying component 720 and DL region communicating component 725. Each of these components may illustrate aspects of a processor, such as the processor 910 or 1010 described with reference to FIGS. 9 and 10.

The DL region identifying component 715 may identify a DL region of a subframe, where the subframe includes the DL region, an UL region, a guard region, and an additional region. In some cases, the timing relationship between the DL region and the UL region is based on a capability of wireless device 700, which may be scheduled for communication during the subframe. In some cases, the timing relationship between the DL region and the UL region is based on a serving cell that schedules communications with wireless device 700 during the subframe. The timing relationship between the DL region and the UL region may be identified using a system information broadcast or radio resource control signaling, or a grant of resources in a DL control message, or any combination thereof.

In some cases, the timing relationship between the DL region and the UL region includes a minimum time duration used for subframes having separate regions for UL and DL communications, and a first duration of the DL region and a second duration of the UL region may be based on the minimum time duration. The duration of the guard region of the subframe may be different from a guard period of a special subframe of a TDD-configured carrier, which, may include a U' or D' subframe and the special subframe.

In some cases, the guard period of the special subframe is configured according to a common capability of each UE in set of UEs, which may include wireless device 700, within a system, and the guard region of the subframe may be configured according to a different capability of a subset of the set of UEs within the system. In some cases, the duration of the guard region of the subframe is based on a first duration of the UL region relative to a second duration of the DL region and a third duration of the additional region. A DL HARQ and an UL scheduling timing for the subframe may be based on the duration of the guard region of the subframe. In some cases, a DL HARQ or an uplink scheduling timing, or both, for the subframe are different from DL HARQ or uplink scheduling timing for a subsequent subframe or a preceding subframe.

In some cases, the timing relationship between the DL region and the UL region is based on a capability of a UE 115 scheduled for communication during the subframe. Or, in some examples, the timing relationship between the DL region and the UL region is based on a serving cell that schedules communications during the subframe. Timing relationship between the DL region and the UL region may be identified by the wireless device 700 using an SI broadcast or RRC signaling, or both. In some cases, the timing relationship between the DL region and the UL region includes a minimum time duration used for subframes having separate regions for UL and DL communications, and where a first duration of the DL region and a second duration of the UL region are based on the minimum time duration. In some cases, the duration of the guard region of the subframe is different from a guard period of a special subframe of a TDD configured carrier, where the TDD configured carrier includes the subframe and the special subframe.

The uplink region identifying component 720 may identify the uplink region of the subframe, where a transmission on resources of the UL region is based on a timing relationship between the DL region and the UL region. The DL region communicating component 725 may communicate during the DL region and the UL region according to the timing relationship.

The transmitter 730 may transmit signals received from other components of the device. The transmitter 730 may also perform the functions described with reference to the transmitter 615 of FIG. 6. Transmitter 730 may also illustrate aspects of a transceiver 925 or transceiver 1025 described with reference to FIGS. 9 and 10.

Figure 8:
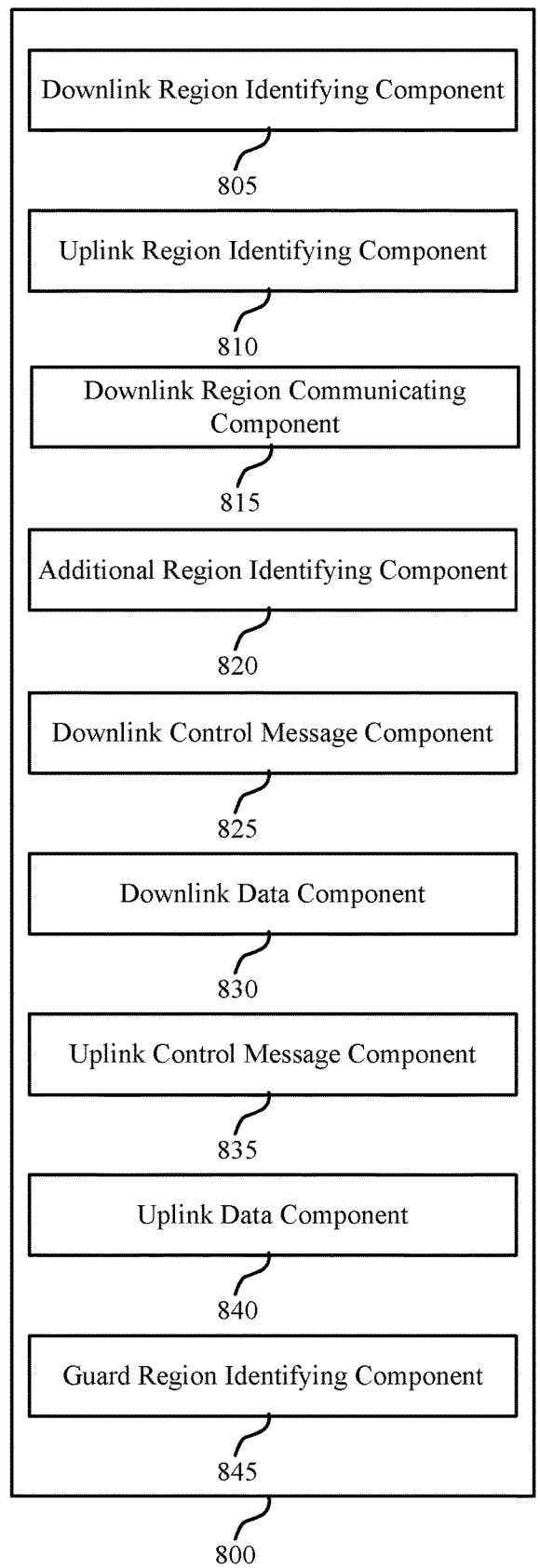

FIG. 8 shows a block diagram of a flexible subframe module 800 which may be an example of the corresponding component of wireless device 600 or wireless device 700. That is, flexible subframe module 800 may be an example of aspects of flexible subframe module 610 or flexible subframe module 710 described with reference to FIGS. 6 and 7. Flexible subframe module 800 may also represent an example of a flexible subframe module 905 or a flexible subframe module 1005 described with reference to FIGS. 9 and 10. By way of example, flexible subframe module 800 may illustrate aspects of processor 910 or 1010 of FIGS. 9 and 10.

The flexible subframe module 800 may include downlink region identifying component 805, uplink region identifying component 810, downlink region communicating component 815, additional region identifying component 820, downlink control message component 825, downlink data component 830, uplink control message component 835, uplink data component 840 and guard region identifying component 845. Each of these components may communicate, directly or indirectly, with one another (e.g., via one or more buses).

The downlink region identifying component 805 may identify a DL region of a subframe, which may include the DL region, an UL region, a guard region, and an additional region. In some cases, the timing relationship between the DL region and the UL region is based on a capability of a UE 115 scheduled for communication during the subframe. In some cases, the timing relationship between the DL region and the UL region is based on a serving cell that schedules communications during the subframe. The timing relationship between the DL region and the UL region may be identified using a system information broadcast, radio resource control signaling, or a grant of resources in a DL control message, or a combination thereof. In some cases, the timing relationship between the DL region and the UL region includes a minimum time duration used for subframes having separate regions for uplink and DL communications, and a first duration of the DL region and a second duration of the UL region are based on the minimum time duration.

In some cases, the duration of the guard region of the subframe is different from a guard period of a special subframe of a TDD-configured carrier, where the time division duplex configured carrier includes the subframe and the special subframe. In some cases, the guard period of the special subframe is configured according to a common capability of each UE 115 in set of UEs 115 within a system, and the guard region of the subframe may be configured according to a different capability of a subset of the set of UEs 115 within the system. In some cases, the duration of the guard region of the subframe is based on a first duration of the UL region relative to a second duration of the DL region and a third duration of the additional region.

A DL HARQ and an UL scheduling timing for the subframe are based on the duration of the guard region of the subframe. In some cases, a DL HARQ or an UL scheduling timing, or both, for the subframe are different from DL HARQ or UL scheduling timing for a subsequent subframe or a preceding subframe. DL region of a subframe. The subframe may include the DL region, an UL region, a guard region, and an additional region.

In some cases, the timing relationship between the DL region and the UL region is based on a capability of a UE 115 scheduled for communication during the subframe. The timing relationship between the DL region and the UL region may be based on a serving cell that schedules communications during the subframe. In some cases, the timing relationship between the DL region and the UL region is identified using an SI broadcast, RRC signaling, or a grant of resources in a DL control message, or any combination thereof. The timing relationship between the DL region and the UL region may include a minimum time duration used for subframes having separate regions for UL and DL communications, and a first duration of the DL region and a second duration of the UL region may be based on the minimum time duration.

The uplink region identifying component 810 may identify the UL region of the subframe, where a transmission on resources of the UL region is based on a timing relationship between the DL region and the UL region. The downlink region communicating component 815 may communicate during the DL region and the UL region according to the timing relationship. DL region and the UL region according to the timing relationship.

The additional region identifying component 820 may identify the additional region of the subframe. The additional region may include, for instance, an additional DL region or an additional UL region. A transmission on resources of the additional region may be based on a timing relationship between the DL region or the UL region and the additional region.

Figure 9:
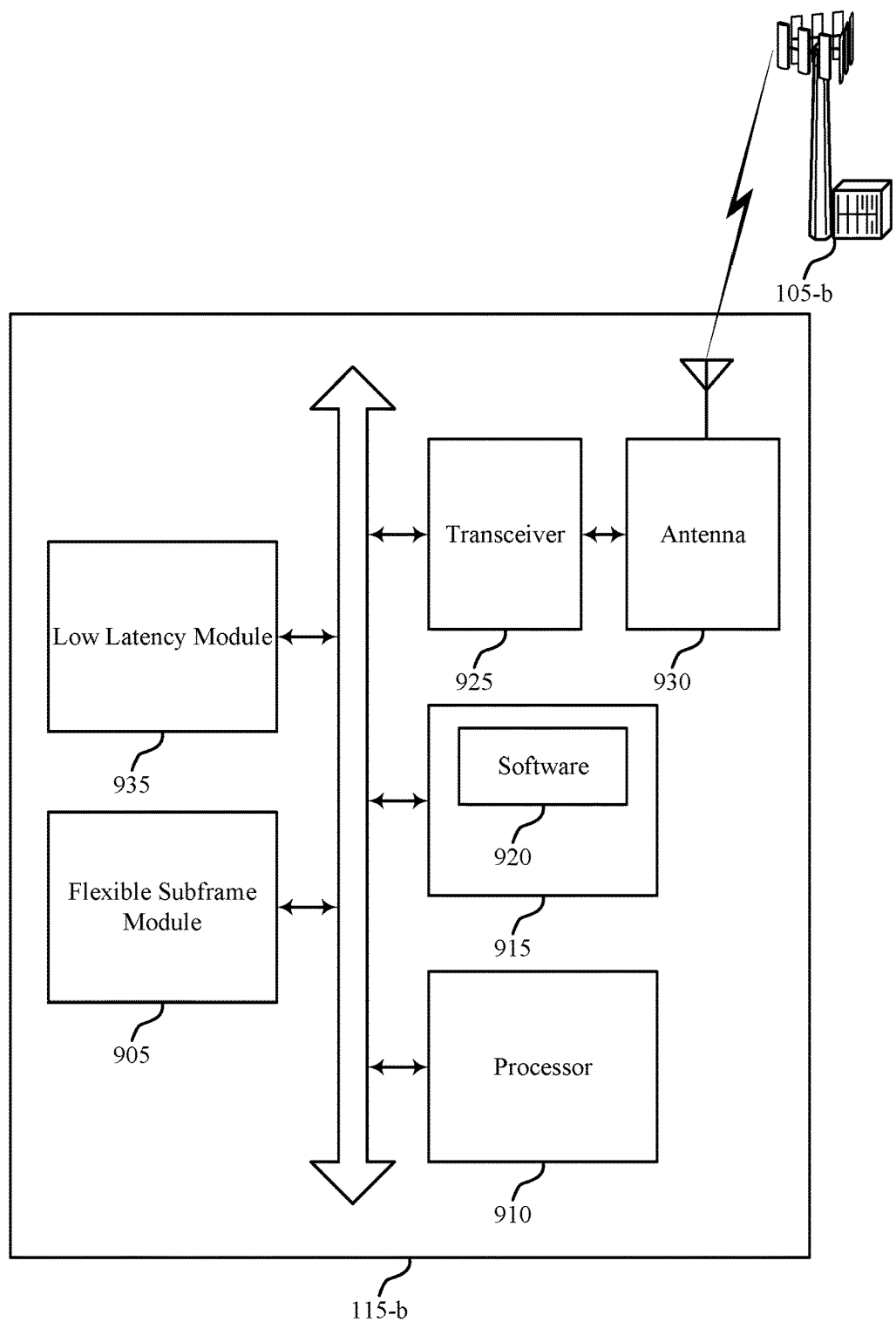
FIG. 9 illustrates a block diagram of a system including a UE that supports flexible TDD subframe structure with latency reduction in accordance with aspects of the present disclosure.
Figure 10:
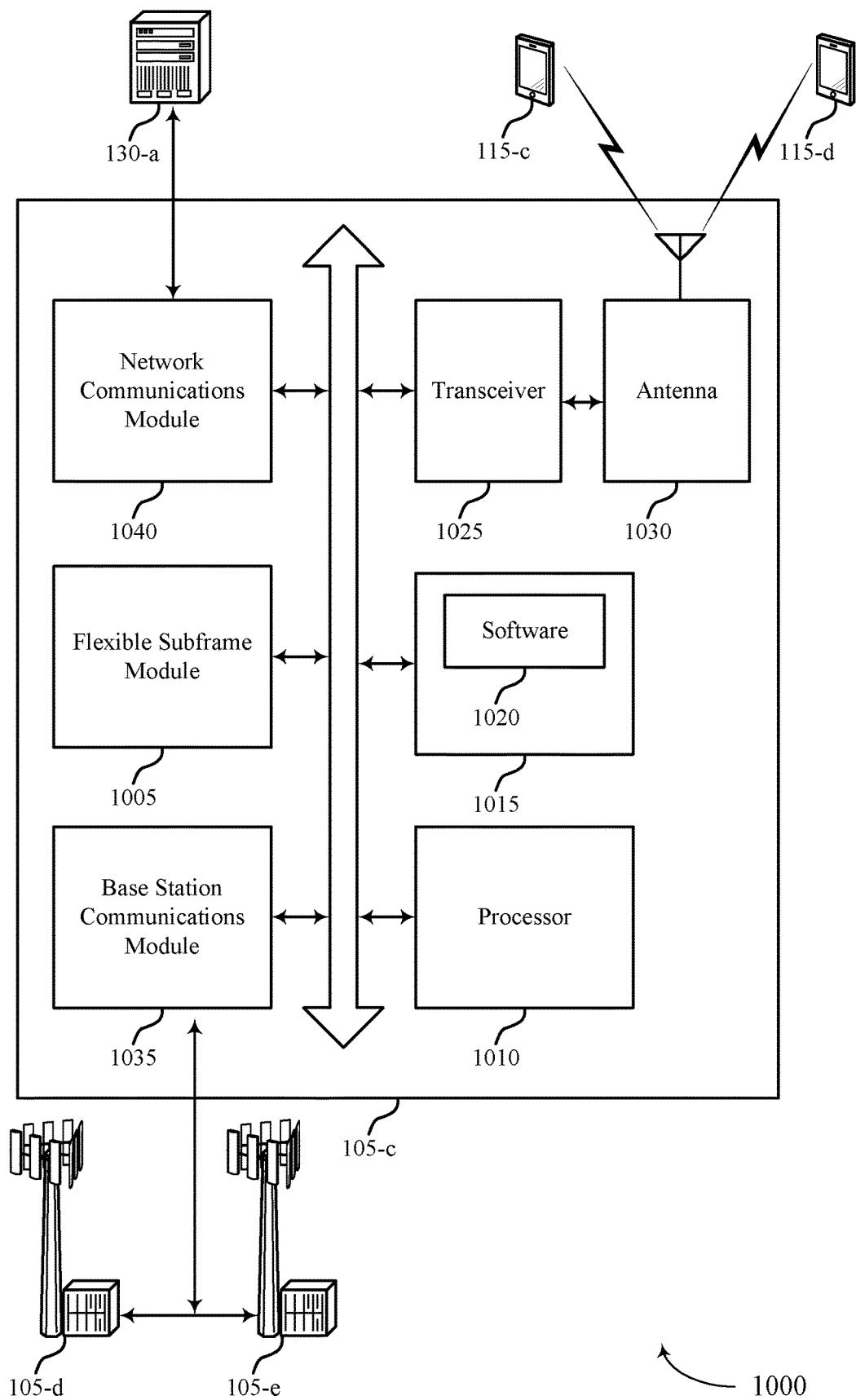
FIG. 10 illustrates a block diagram of a system including a base station that supports flexible TDD subframe structure with latency reduction in accordance with aspects of the present disclosure.

The downlink control message component 825 may, in combination with transceiver 925 or 1025 of FIG. 9 or 10, for example, transmit or receive various signals or messages. For instance, downlink control message component 825 may transmit a DL control message during the DL region and receive a DL control message during the DL region.

The downlink data component 830 may, in combination with transceiver 925 or 1025 of FIG. 9 or 10, for example, transmit or receive various signals or messages. The downlink data component 830 may, for instance, receive DL data during the DL region, where resources of the DL region are scheduled by the DL control message receive DL data during the additional region, where the additional region follows the DL region and precedes the UL region. The additional region may include an additional DL region, which in turn may include resources scheduled by the DL control message. The downlink data component 830 may also, receive the DL data during the DL region, where the DL data includes a single transport block mapped to resources of the DL region and the additional DL region.

In some examples, the downlink data component 830 may transmit DL data during the DL region, where resources of the DL region may be scheduled by the DL control message. The downlink data component 830 may also transmit DL data during the additional region, where the additional region follows the DL region and precedes the UL region and the additional region may include an additional DL region that, in turn, may include resources scheduled by the DL control message. In some examples, the downlink data component 830 may transmit the DL data during the DL region, where the DL data may include a same transport block mapped to resources of the DL region and the additional DL region.

The uplink control message component 835 may, in combination with transceiver 925 or 1025 of FIG. 9 or 10, for example, transmit or receive various signals or messages. The uplink control message component 835 may transmit an UL control message during the UL region, where the UL control message may include ACK information for DL data received during a DL region of the same subframe. The uplink control message component 835 may also, transmit an UL control message during a subsequent subframe, where the UL control message may include acknowledgment information for the DL data received during the additional DL region. In some cases, the uplink control message component 835 may receive an UL control message during the UL region, where the UL control message may include ACK information for the DL data received during the DL region. The uplink control message component 835 may also receive an UL control message during a subsequent subframe, where the UL control message includes acknowledgment information for the DL data received during the additional DL region.

The uplink data component 840 may, in combination with transceiver 925 or 1025 of FIG. 9 or 10, for example, transmit or receive various signals or messages. The uplink data component 840 may receive UL data or an UL control message, or both, during the UL region, and the resources of the UL region may be scheduled by the DL control message. The uplink data component 840 may transmit UL data or an UL control message, or both, during the additional region, where the additional region follows the DL region and precedes the UL region, and where the additional region may include an additional UL region with resources scheduled by another DL control message in a preceding subframe. In some cases, uplink data component 840 may, receive UL data or an UL control message, or both, during the UL region. In these cases, the resources of the UL region may be scheduled by the DL control message. In some cases, uplink data component 840 may, receive UL data or an UL control message, or both, during the additional region. In these cases, the additional region may follow the DL region and precede the UL region, and the additional region may include an additional UL region with resources scheduled by another DL control message in a preceding subframe.

The guard region identifying component 845 may identify the guard region of the subframe, where the timing relationship between the DL region and the UL region is based on a location of the guard region within the subframe or a duration of the guard region, or both.

FIG. 9 shows a diagram of a system 900, including a UE that supports flexible TDD subframe structure with latency reduction in accordance with various aspects of the present disclosure. For example, system 900 may include UE 115-b, which may be an example of a wireless device 600, a wireless device 700, or a UE 115 as described with reference to FIGS. 1, 2 and 6 through 8.

UE 115-b may also include flexible subframe module 905, processor 910, memory 915, transceiver 925, antenna 930 and low latency module 935. Each of these modules may communicate, directly or indirectly, with one another (e.g., via one or more buses). The flexible subframe module 905 may be an example of a flexible subframe module as described with reference to FIGS. 6 through 8.

The processor 910 may include an intelligent hardware device, (e.g., a central processing unit (CPU), a microcontroller, an application specific integrated circuit (ASIC), etc.). The memory 915 may include random access memory (RAM) and read only memory (ROM). The memory 915 may store computer-readable, computer-executable software including instructions that, when executed, cause the processor to perform various functions described herein (e.g., flexible TDD subframe structure with latency reduction, etc. as described with reference to FIGS. 6-8).

In some cases, the software 920 may not be directly executable by the processor but may cause a computer (e.g., when compiled and executed) to perform functions described herein.

The transceiver 925 may communicate bi-directionally, via multiple antennas, wired, or wireless links, with multiple networks, as described above. For example, the transceiver 925 may communicate bi-directionally with a base station 105 or a UE 115. The transceiver 925 may also include a modem to modulate the packets and provide the modulated packets to the antennas for transmission, and to demodulate packets received from the antennas.

In some cases, the wireless device may include a single antenna 930. However, in some cases the device may have more than one antenna 930, which may be capable of concurrently transmitting or receiving multiple wireless transmissions. The transceiver 925 and the antenna 930 may transmit or receive the various signaling or messages described with reference to FIGS. 6-8.

The low latency module 935 may enable operations using enhanced component carrier (eCCs) such as communication using shared or unlicensed spectrum, using reduced transmission time interval (TTI) or subframe durations, or using a large number of component carriers (CCs). In some examples, the low latency module 935, in combination with transceiver 925 and antenna 930 may signal a capability of UE 115-b to support communication using low latency (e.g., U' or D') subframes.

FIG. 10 shows a diagram of a wireless system 1000 including a base station configured that supports flexible TDD subframe structure with latency reduction in accordance with various aspects of the present disclosure. For example, system 1000 may include base station 105-c, which may be an example of a wireless device 600, a wireless device 700, or a base station 105 as described with reference to FIGS. 1, 2 and 6 through 8. Base station 105-c may also include components for bi-directional voice and data communications including components for transmitting communications and components for receiving communications. For example, base station 105-*c* may communicate bi-directionally with multiple UEs 115.

Base station 105-*c* may also include flexible subframe module 1005, processor 1010, memory 1015, transceiver 1025, antenna 1030, base station communications module 1035, and network communications module 1040. Each of these modules may communicate, directly or indirectly, with one another (e.g., via multiple buses). The flexible subframe module 1005 may be an example of a flexible subframe module as described with reference to FIGS. 6 through 8. The processor 1010 may include an intelligent hardware device, (e.g., a CPU, a microcontroller, an ASIC, etc.)

The memory 1015 may include RAM and ROM. The memory 1015 may store computer-readable, computer-executable software including instructions that, when executed, cause the processor to perform various functions described herein (e.g., flexible TDD subframe structure with latency reduction, etc. as described with reference to FIGS. 6-8). In some cases, the software 1020 may not be directly executable by the processor but may cause a computer (e.g., when compiled and executed) to perform functions described herein.

The transceiver 1025 may communicate bi-directionally, via multiple antennas, wired, or wireless links, with multiple networks, as described above. For example, the transceiver 1025 may communicate bi-directionally with a base station 105 or a UE 115. The transceiver 1025 may also include a modem to modulate the packets and provide the modulated packets to the antennas for transmission, and to demodulate packets received from the antennas. In some cases, the wireless device may include a single antenna 1030. However, in some cases the device may have more than one antenna 1030, which may be capable of concurrently transmitting or receiving multiple wireless transmissions. The transceiver 1025 and the antenna 1030 may transmit or receive the various signaling or messages described with reference to FIGS. 6-8.

The base station communications module 1035 may manage communications with other base station 105, and may include a controller or scheduler for controlling communications with UEs 115 in cooperation with other base stations 105. For example, the base station communications module 1035 may coordinate scheduling for transmissions to UEs 115 for various interference mitigation techniques such as beamforming or joint transmission. In some examples, base station communications module 1035 may provide an X2 interface within an LTE/LTE-A wireless communication network technology to provide communication between base stations 105.

The network communications module 1040 may manage communications with the core network (e.g., via multiple wired backhaul links). For example, the network communications module 1040 may manage the transfer of data communications for client devices, such as multiple UEs 115.

Figure 11:
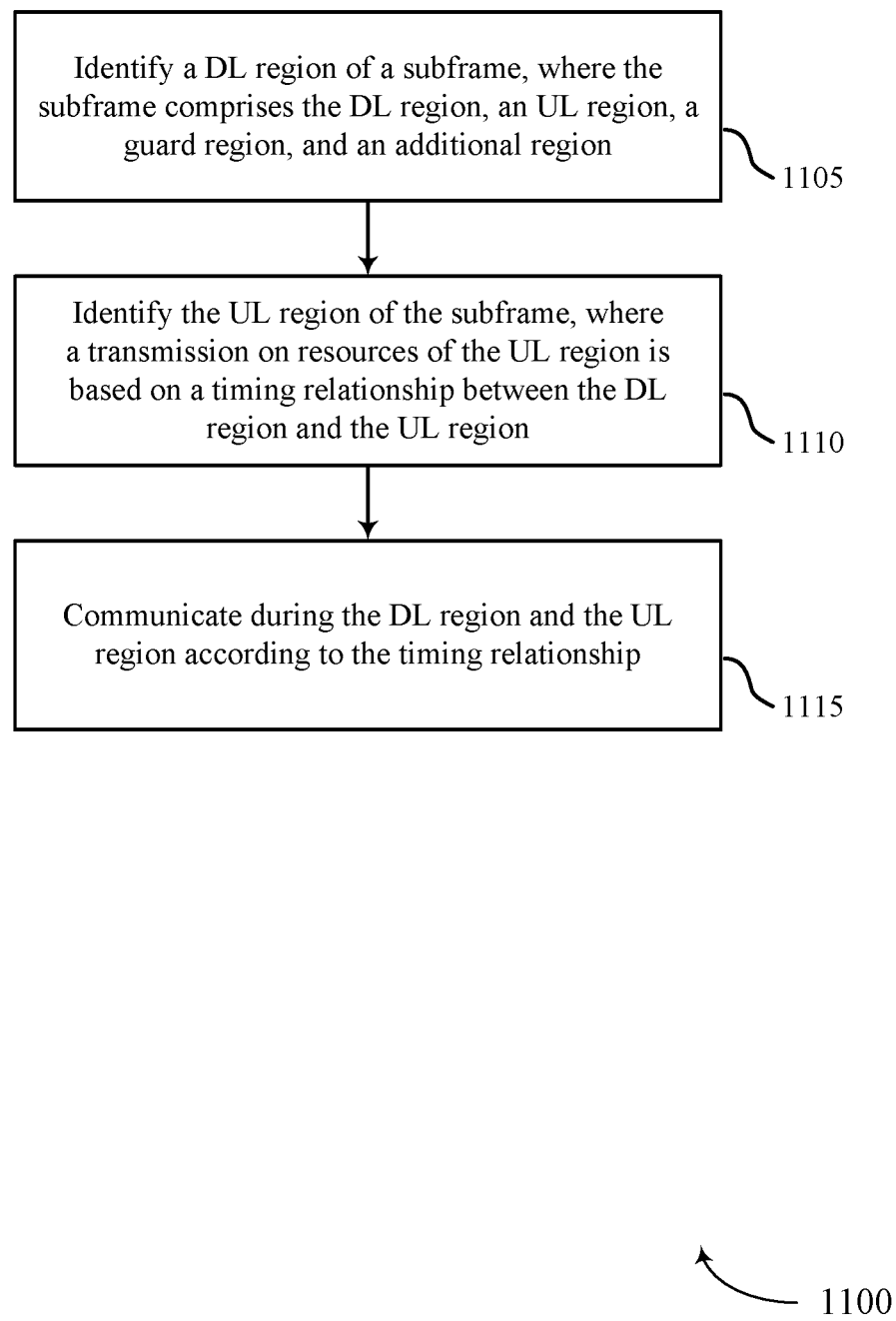
FIGS. 11 through 17 illustrate methods for flexible TDD subframe structure with latency reduction in accordance with aspects of the present disclosure.

FIG. 11 shows a flowchart illustrating a method 1100 that supports flexible TDD subframe structure with latency reduction in accordance with various aspects of the present disclosure. The operations of method 1100 may be implemented by a UE 115 or base station 105 or its components as described with reference to FIGS. 1 and 2. For example, the operations of method 1100 may be performed by the flexible subframe module as described herein. In some examples, the UE 115 or base station 105 may execute a set of codes to control the functional elements of the device to perform the functions described below. Additionally or alternatively, the UE 115 or base station 105 may perform aspects of the functions described below using special-purpose hardware.

At block 1105, the UE 115 or base station 105 may identify a DL region of a subframe, where the subframe includes the DL region, an UL region, a guard region, and an additional region as described above with reference to FIGS. 2 through 5. In some examples, the operations of block 1105 are performed by components of flexible subframe module 905 of FIG. 9, as described with reference to downlink region identifying component 805 of FIG. 8, in combination with transceiver 925 and antenna 930 of FIG. 9. In other examples, the operations of block 1105 are performed by components of flexible subframe module 1005 of FIG. 10, as described with reference to downlink region identifying component 805 of FIG. 8, in combination with transceiver 1025 and antenna 1030 of FIG. 10.

At block 1110, the UE 115 or base station 105 may identify the UL region of the subframe, where a transmission on resources of the UL region is based on a timing relationship between the DL region and the UL region as described above with reference to FIGS. 2 through 5. In some examples, the operations of block 1105 are performed by components of flexible subframe module 905 of FIG. 9, as described with reference to uplink region identifying component 810 of FIG. 8, in combination with transceiver 925 and antenna 930 of FIG. 9. In other examples, the operations of block 1105 are performed by components of flexible subframe module 1005 of FIG. 10, as described with reference to the uplink region identifying component 810 of FIG. 8, in combination with transceiver 1025 and antenna 1030 of FIG. 10.

At block 1115, the UE 115 or base station 105 may communicate during the DL region and the UL region according to the timing relationship as described above with reference to FIGS. 2 through 5. In some examples, the operations of block 1105 are performed by transceiver 925 and antenna 930 of FIG. 9. In other examples, the operations of block 1105 are performed by transceiver 1025 and antenna 1030 of FIG. 10. In some cases, the operations of block 1105 may be performed by downlink region communicating component 815 of FIG. 8, at times in combination with a transceiver and antenna.

Figure 12:
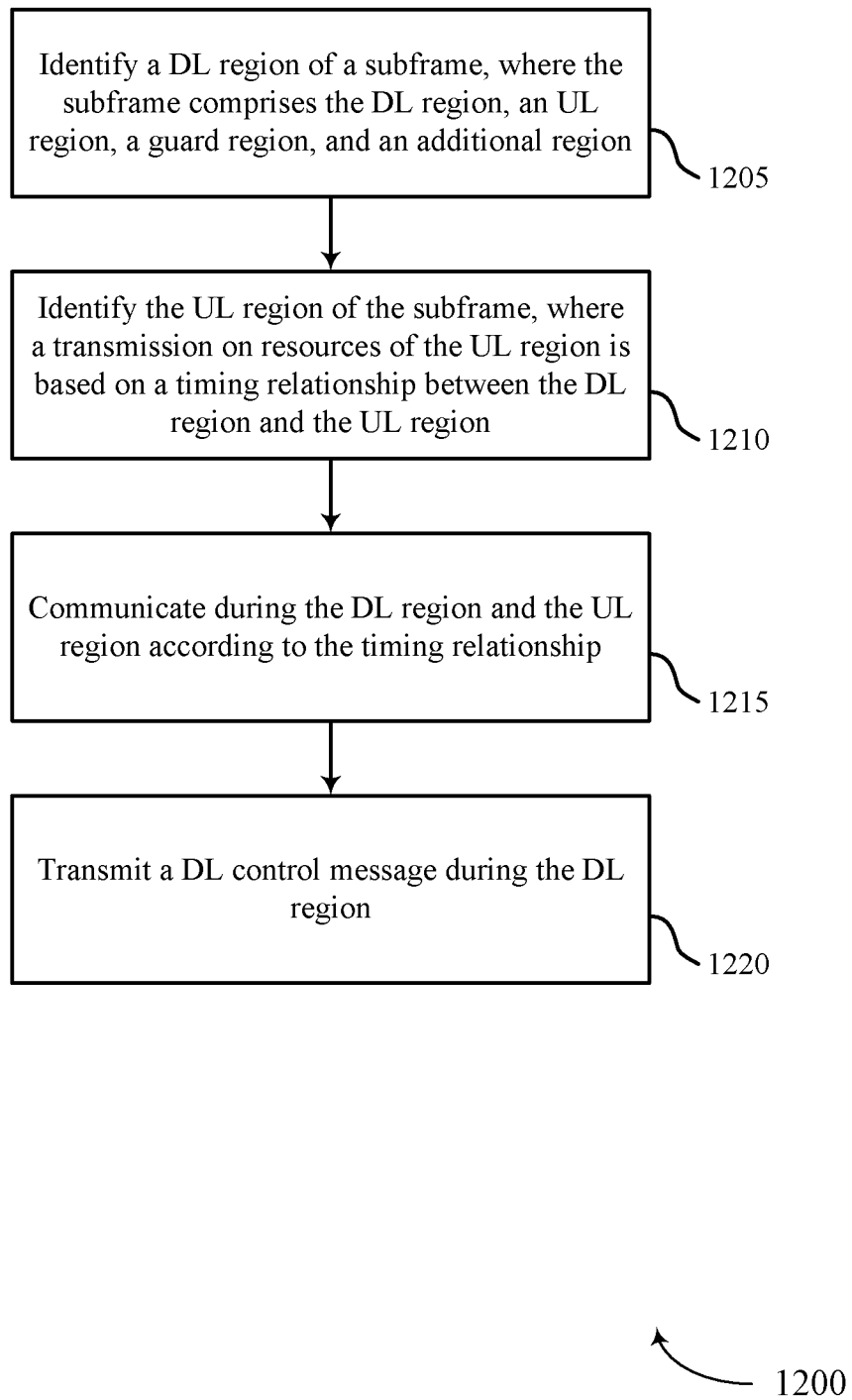

FIG. 12 shows a flowchart illustrating a method 1200 that supports flexible TDD subframe structure with latency reduction in accordance with various aspects of the present disclosure. The operations of method 1200 may be implemented by a base station 105 or its components as described with reference to FIGS. 1 and 2. For example, the operations of method 1200 may be performed by the flexible subframe module as described herein. In some examples, the base station 105 may execute a set of codes to control the functional elements of the device to perform the functions described below. Additionally or alternatively, the base station 105 may perform aspects of the functions described below using special-purpose hardware.

At block 1205, the base station 105 may identify a DL region of a subframe, where the subframe includes the DL region, an UL region, a guard region, and an additional region as described above with reference to FIGS. 2 through 5. In some examples, the operations of block 1205 are performed by components of flexible subframe module 1005 of FIG. 10, as described with reference to downlink region identifying component 805 of FIG. 8, in combination with transceiver 1025 and antenna 1030 of FIG. 10.

At block 1210, the base station 105 may identify the UL region of the subframe, where a transmission on resources of the UL region is based on a timing relationship between the DL region and the UL region as described above with reference to FIGS. 2 through 5. In some examples, the operations of block 1210 are performed by components of flexible subframe module 1005 of FIG. 10, as described with reference to uplink region identifying component 810 of FIG. 8, in combination with transceiver 1025 and antenna 1030 of FIG. 10.

At block 1215, the base station 105 may communicate during the DL region and the UL region according to the timing relationship as described above with reference to FIGS. 2 through 5. At block 1220, the base station 105 may transmit a DL control message during the DL region as described above with reference to FIGS. 2 through 5. In some examples, the operations of blocks 1215 and 1220 are performed by transceiver 1025 and antenna 1030 of FIG. 10.

Figure 13:
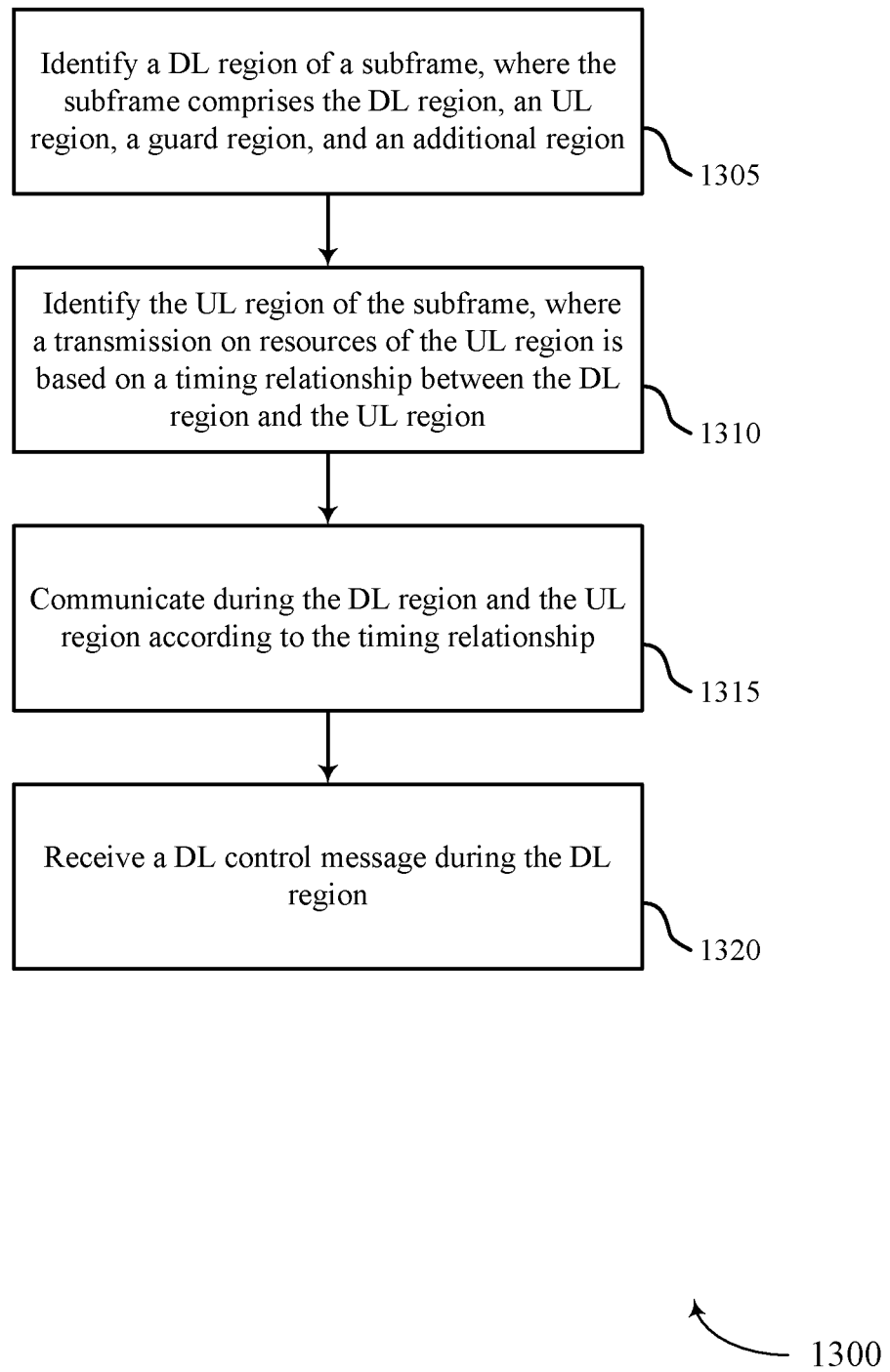

FIG. 13 shows a flowchart illustrating a method 1300 that supports flexible TDD subframe structure with latency reduction in accordance with various aspects of the present disclosure. The operations of method 1300 may be implemented by a UE 115 or its components as described with reference to FIGS. 1 and 2. For example, the operations of method 1300 may be performed by the flexible subframe module as described herein. In some examples, the UE 115 may execute a set of codes to control the functional elements of the device to perform the functions described below. Additionally or alternatively, the UE 115 may perform aspects of the functions described below using special-purpose hardware.

At block 1305, the UE 115 may identify a DL region of a subframe, where the subframe includes the DL region, an UL region, a guard region, and an additional region as described above with reference to FIGS. 2 through 5. In some examples, the operations of block 1305 are performed by components of flexible subframe module 905 of FIG. 9, as described with reference to downlink region identifying component 805 of FIG. 8, in combination with transceiver 925 and antenna 930 of FIG. 9.

At block 1310, the UE 115 may identify the UL region of the subframe, where a transmission on resources of the UL region is based on a timing relationship between the DL region and the UL region as described above with reference to FIGS. 2 through 5. In some examples, the operations of block 1310 are performed by components of flexible subframe module 905 of FIG. 9, as described with reference to uplink region identifying component 810 of FIG. 8, in combination with transceiver 925 and antenna 930 of FIG. 9.

At block 1315, the UE 115 may communicate during the DL region and the UL region according to the timing relationship as described above with reference to FIGS. 2 through 5. At block 1320, the UE 115 may receive a DL control message during the DL region as described above with reference to FIGS. 2 through 5. In some examples, the operations of blocks 1315 and 1320 are performed by transceiver 925 and antenna 930 of FIG. 9.

Figure 14:
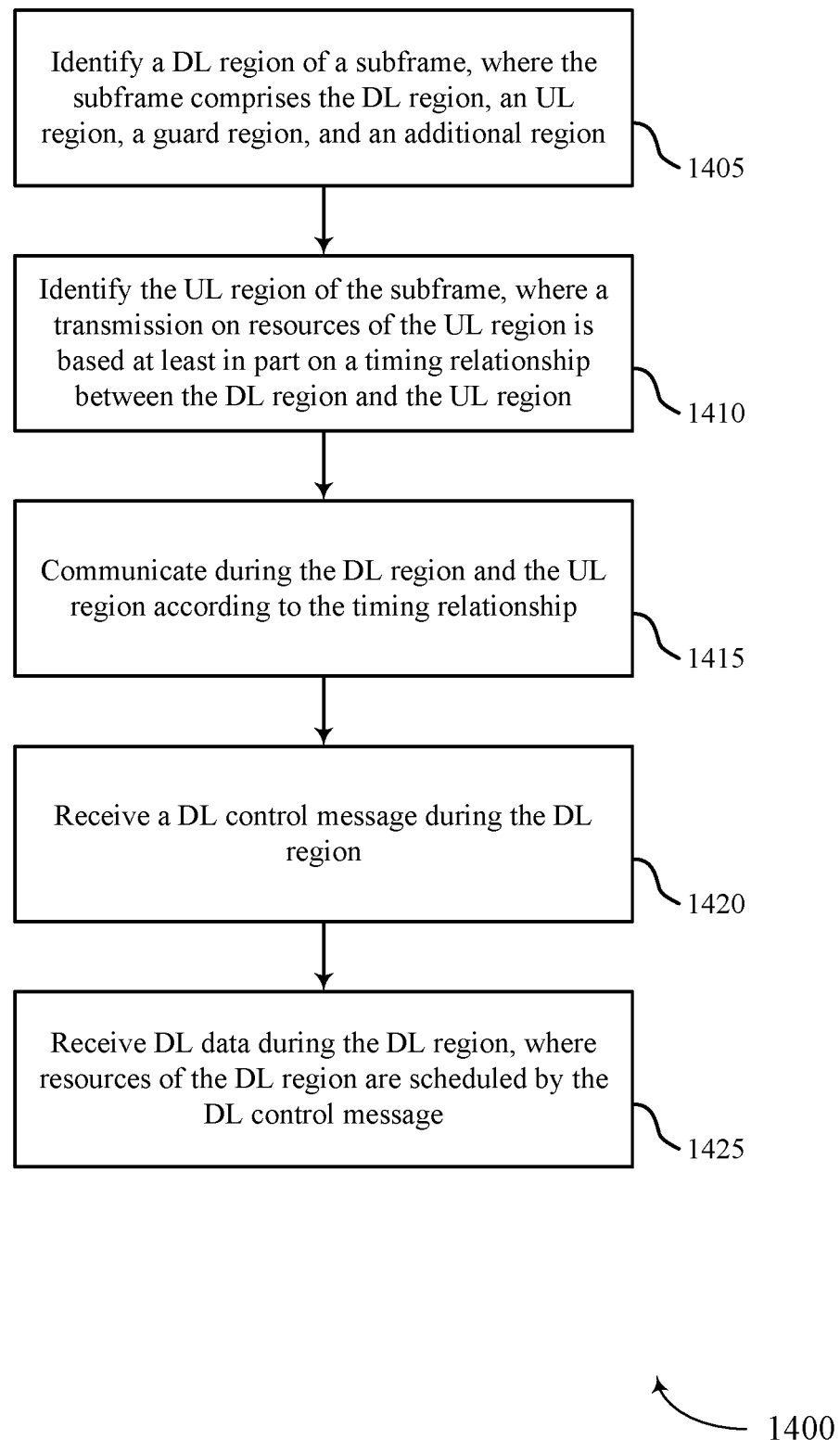

FIG. 14 shows a flowchart illustrating a method 1400 that supports flexible TDD subframe structure with latency reduction in accordance with various aspects of the present disclosure. The operations of method 1400 may be implemented by a UE 115 or its components as described with reference to FIGS. 1 and 2. For example, the operations of method 1400 may be performed by the flexible subframe module as described herein. In some examples, the UE 115 may execute a set of codes to control the functional elements of the device to perform the functions described below. Additionally or alternatively, the UE 115 may perform aspects of the functions described below using special-purpose hardware.

At block 1405, the UE 115 may identify a DL region of a subframe, where the subframe includes the DL region, an UL region, a guard region, and an additional region as described above with reference to FIGS. 2 through 5. In some examples, the operations of block 1405 are performed by components of flexible subframe module 905 of FIG. 9, as described with reference to downlink region identifying component 805 of FIG. 8, in combination with transceiver 925 and antenna 930 of FIG. 9.

At block 1410, the UE 115 may identify the UL region of the subframe, where a transmission on resources of the UL region is based on a timing relationship between the DL region and the UL region as described above with reference to FIGS. 2 through 5. In some examples, the operations of block 1410 are performed by components of flexible subframe module 905 of FIG. 9, as described with reference to uplink region identifying component 810 of FIG. 8, in combination with transceiver 925 and antenna 930 of FIG. 9.

At block 1415, the UE 115 may communicate during the DL region and the UL region according to the timing relationship as described above with reference to FIGS. 2 through 5. At block 1420, the UE 115 may receive a DL control message during the DL region as described above with reference to FIGS. 2 through 5. In some examples, the operations of blocks 1415 and 1420 are performed by transceiver 925 and antenna 930 of FIG. 9.

At block 1425, the UE 115 may receive DL data during the DL region, where resources of the DL region are scheduled by the DL control message as described above with reference to FIGS. 2 through 5. In some examples, the operations of block 1425 are performed by transceiver 925 and antenna 930 of FIG. 9.

Figure 15:
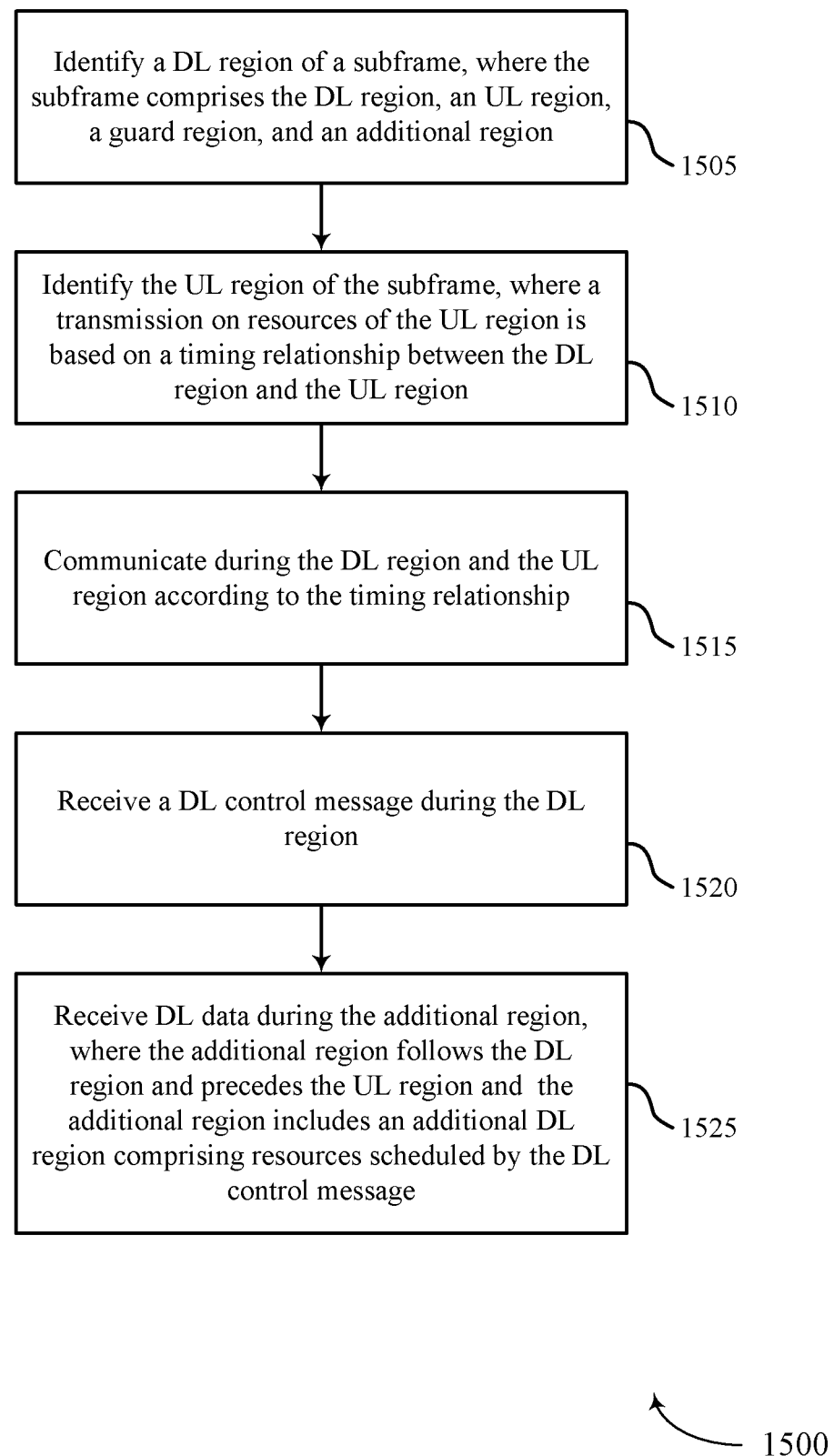

FIG. 15 shows a flowchart illustrating a method 1500 that supports flexible TDD subframe structure with latency reduction in accordance with various aspects of the present disclosure. The operations of method 1500 may be implemented by a UE 115 or its components as described with reference to FIGS. 1 and 2. For example, the operations of method 1500 may be performed by the flexible subframe module as described herein. In some examples, the UE 115 may execute a set of codes to control the functional elements of the device to perform the functions described below. Additionally or alternatively, the UE 115 may perform aspects of the functions described below using special-purpose hardware.

At block 1505, the UE 115 may identify a DL region of a subframe, where the subframe includes the DL region, an UL region, a guard region, and an additional region as described above with reference to FIGS. 2 through 5. In some examples, the operations of block 1505 are performed by components of flexible subframe module 905 of FIG. 9, as described with reference to downlink region identifying component 805 of FIG. 8, in combination with transceiver 925 and antenna 930 of FIG. 9.

At block 1510, the UE 115 may identify the UL region of the subframe, where a transmission on resources of the UL region is based on a timing relationship between the DL region and the UL region as described above with reference to FIGS. 2 through 5. In some examples, the operations of block 1510 are performed by components of flexible subframe module 905 of FIG. 9, as described with reference to uplink region identifying component 810 of FIG. 8, in combination with transceiver 925 and antenna 930 of FIG. 9.

At block 1515, the UE 115 may communicate during the DL region and the UL region according to the timing relationship as described above with reference to FIGS. 2 through 5. At block 1520, the UE 115 may receive a DL control message during the DL region as described above with reference to FIGS. 2 through 5. In some examples, the operations of blocks 1515 and 1520 are performed by transceiver 925 and antenna 930 of FIG. 9.

At block 1525, the UE 115 may receive DL data during the additional region, where the additional region follows the DL region and precedes the UL region, and where the additional region includes an additional DL region including resources scheduled by the DL control message as described above with reference to FIGS. 2 through 5. In some examples, the operations of block 1525 are performed by transceiver 925 and antenna 930 of FIG. 9.

Figure 16:
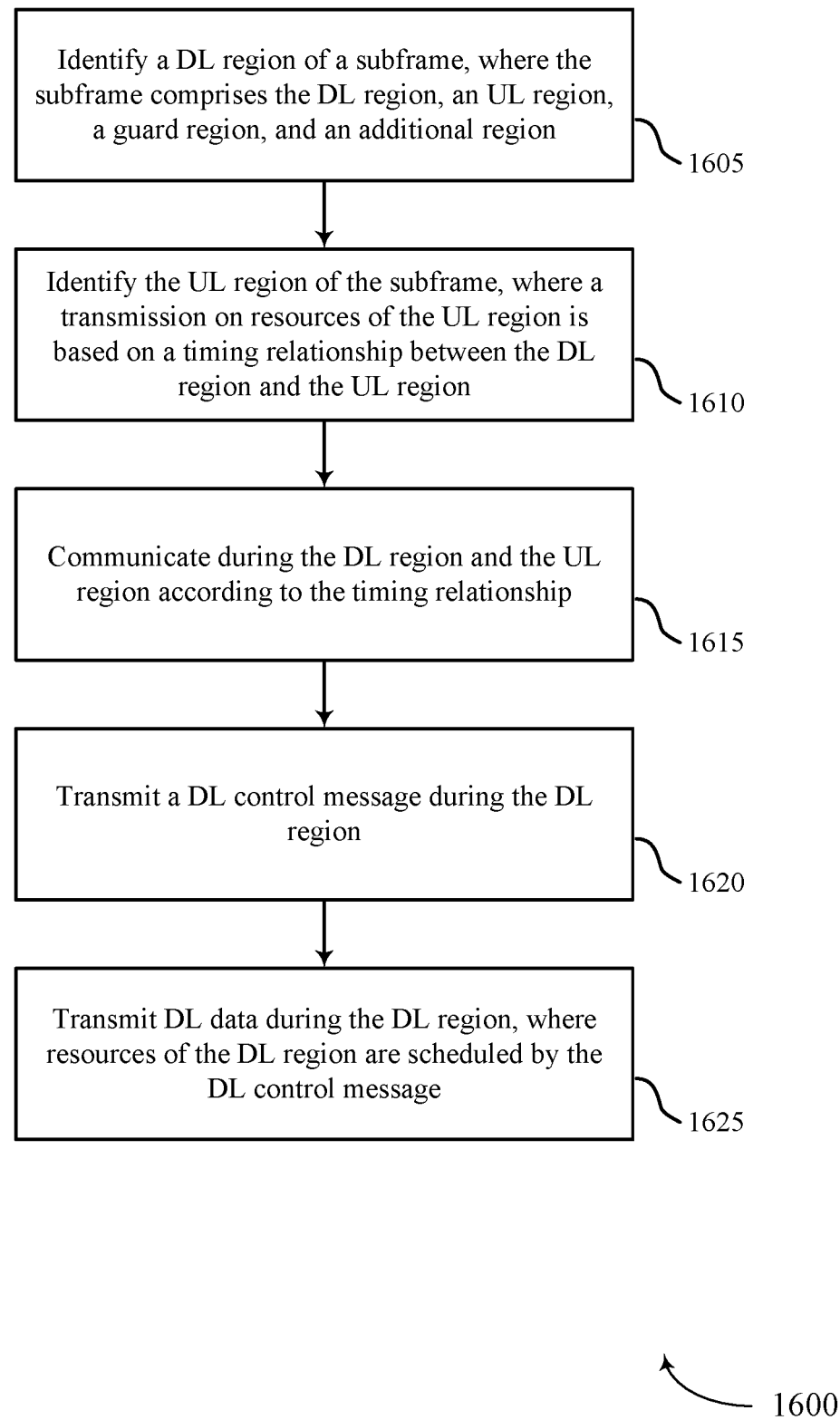

FIG. 16 shows a flowchart illustrating a method 1600 that supports flexible TDD subframe structure with latency reduction in accordance with various aspects of the present disclosure. The operations of method 1600 may be implemented by a base station 105 or its components as described with reference to FIGS. 1 and 2. For example, the operations of method 1600 may be performed by the flexible subframe module as described herein. In some examples, the base station 105 may execute a set of codes to control the functional elements of the device to perform the functions described below. Additionally or alternatively, the base station 105 may perform aspects of the functions described below using special-purpose hardware.

At block 1605, the base station 105 may identify a DL region of a subframe, where the subframe includes the DL region, an UL region, a guard region, and an additional region as described above with reference to FIGS. 2 through 5. In some examples, the operations of block 1605 are performed by components of flexible subframe module 1005 of FIG. 10, as described with reference to downlink region identifying component 805 of FIG. 8, in combination with transceiver 1025 and antenna 1030 of FIG. 10.

At block 1610, the base station 105 may identify the UL region of the subframe, where a transmission on resources of the UL region is based on a timing relationship between the DL region and the UL region as described above with reference to FIGS. 2 through 5. In some examples, the operations of block 1610 are performed by components of flexible subframe module 1005 of FIG. 10, as described with reference to uplink region identifying component 810 of FIG. 8, in combination with transceiver 1025 and antenna 1030 of FIG. 10.

At block 1615, the base station 105 may communicate during the DL region and the UL region according to the timing relationship as described above with reference to FIGS. 2 through 5. At block 1620, the base station 105 may transmit a DL control message during the DL region as described above with reference to FIGS. 2 through 5. In some examples, the operations of blocks 1615 and 1620 are performed by transceiver 1025 and antenna 1030 of FIG. 10.

At block 1625, the base station 105 may transmit DL data during the DL region, where resources of the DL region are scheduled by the DL control message as described above with reference to FIGS. 2 through 5. In some examples, the operations of block 1625 are performed by transceiver 1025 and antenna 1030 of FIG. 10.

Figure 17:
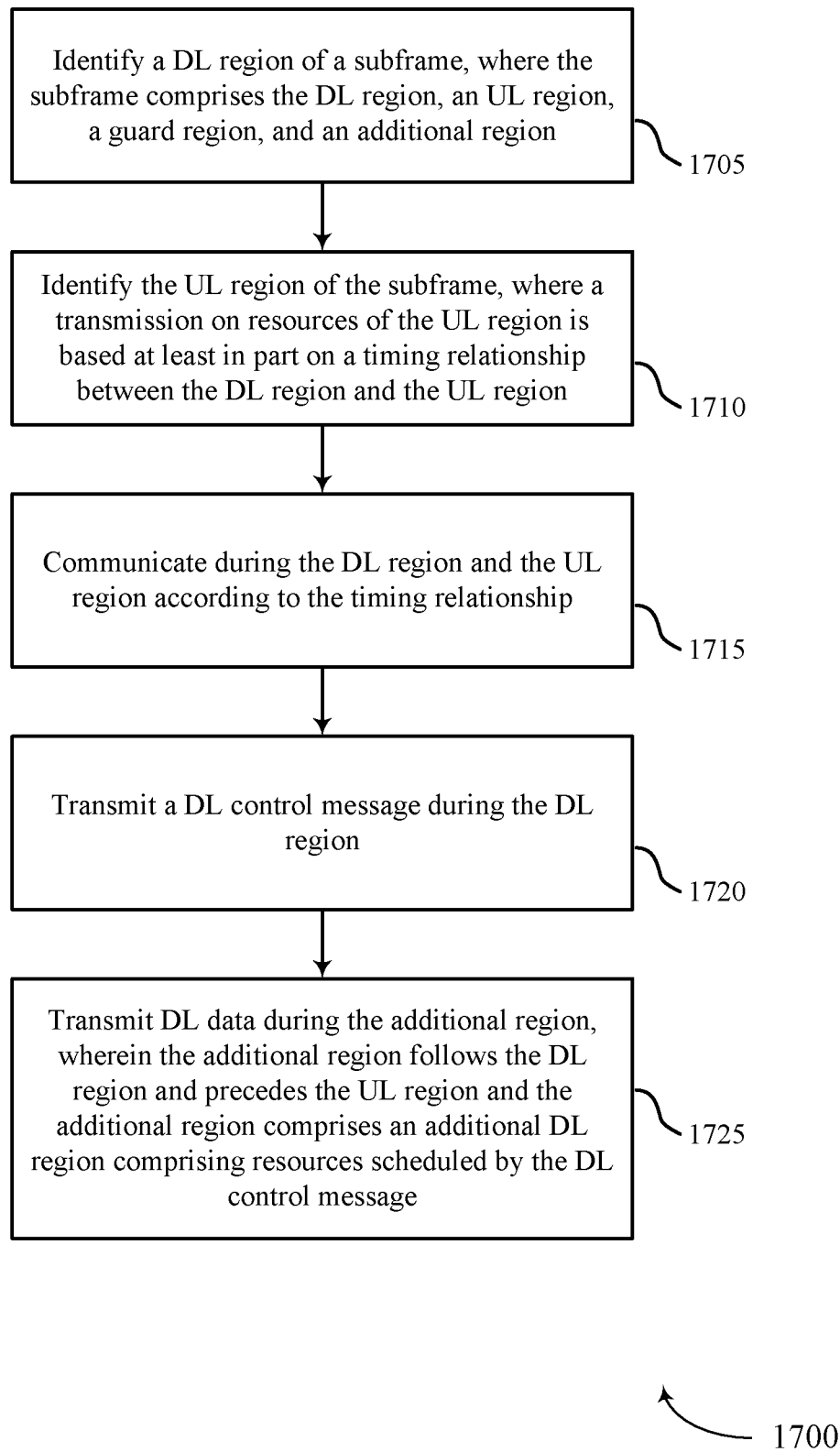

FIG. 17 shows a flowchart illustrating a method 1700 that supports flexible TDD subframe structure with latency reduction in accordance with various aspects of the present disclosure. The operations of method 1700 may be implemented by a base station 105 or its components as described with reference to FIGS. 1 and 2. For example, the operations of method 1700 may be performed by the flexible subframe module as described herein. In some examples, the base station 105 may execute a set of codes to control the functional elements of the device to perform the functions described below. Additionally or alternatively, the base station 105 may perform aspects of the functions described below using special-purpose hardware.

At block 1705, the base station 105 may identify a DL region of a subframe, where the subframe includes the DL region, an UL region, a guard region, and an additional region as described above with reference to FIGS. 2 through 5. In some examples, the operations of block 1705 are performed by components of flexible subframe module 1005 of FIG. 10, as described with reference to downlink region identifying component 805 of FIG. 8, in combination with transceiver 1025 and antenna 1030 of FIG. 10.

At block 1710, the base station 105 may identify the UL region of the subframe, where a transmission on resources of the UL region is based on a timing relationship between the DL region and the UL region as described above with reference to FIGS. 2 through 5. In some examples, the operations of block 1710 are performed by components of flexible subframe module 1005 of FIG. 10, as described with reference to uplink region identifying component 810 of FIG. 8, in combination with transceiver 1025 and antenna 1030 of FIG. 10.

At block 1715, the base station 105 may communicate during the DL region and the UL region according to the timing relationship as described above with reference to FIGS. 2 through 5. At block 1720, the base station 105 may transmit a DL control message during the DL region as described above with reference to FIGS. 2 through 5. In some examples, the operations of blocks 1715 and 1720 are performed by transceiver 1025 and antenna 1030 of FIG. 10.

At block 1725, the base station 105 may transmit DL data during the additional region, where the additional region follows the DL region and precedes the UL region, and where the additional region includes an additional DL region including resources scheduled by the DL control message as described above with reference to FIGS. 2 through 5. In some examples, the operations of block 1725 are performed by transceiver 1025 and antenna 1030 of FIG. 10.

Each of the methods 1100, 1200, 1300, 1400, 1500, 1600, and 1700 may represent examples of the techniques described herein, but are not the only implementations. For example, aspects of each of the methods 1100, 1200, 1300, 1400, 1500, 1600, and 1700 may include steps or aspects of the other methods, or other steps or techniques described herein with reference to FIGS. 2 through 5. Thus, aspects of the disclosure may provide for flexible TDD subframe structure with latency reduction. It should be noted that these methods describe possible implementation, and that the operations and the steps may be rearranged or otherwise modified such that other implementations are possible. In some examples, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as (Global System for Mobile communications (GSM)).

An OFDMA system may implement a radio technology such as Ultra Mobile Broadband (UMB), Evolved UTRA (E-UTRA), IEEE 802.11 (wireless fidelity (Wi-Fi)), IEEE 802.16 (WiMAX), IEEE 802.20, Frequency division multiplexing (FDM), etc. UTRA and E-UTRA are part of Universal Mobile Telecommunications system (Universal Mobile Telecommunications System (UMTS)). 3GPP LTE and LTE-Advanced (LTE-A) are new releases of UMTS that use E-UTRA. UTRA, E-UTRA, UMTS, LTE, LTE-A, and GSM are described in documents from an organization named "Third Generation Partnership Project" (3GPP). CDMA2000 and UMB are described in documents from an organization named "Third Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term eNB may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or CC associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up a portion of the coverage area. The wireless communications system or systems described herein may include base station of different types (e.g., macro or small cell base stations). The UEs 115 described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs 115 with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include multiple carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or TDD operation (e.g., using unpaired spectrum resources). Frame structures may be defined for FDD (e.g., frame structure type 1) and TDD (e.g., frame structure type 2).

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," "component," and the like may not be a substitute for the word "means." As such, no claim element is to be construed as a means plus function unless the element is expressly recited using the phrase "means for."

The systems, devices, and components described herein may, individually or collectively, be implemented with at least one ASIC adapted to perform some or all of the applicable functions in hardware. Alternatively, the functions may be performed by multiple other processing units (or cores), on at least one IC. In other examples, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by multiple general or application-specific processors.

What is claimed is:

1. A method of wireless communication comprising:
   identifying a downlink (DL) region of a subframe, wherein the subframe comprises the DL region, an uplink (UL) region, a guard region, and an additional region;
   identifying the UL region of the subframe, wherein a transmission on resources of the UL region is based at least in part on a timing relationship between the DL region and the UL region; and
   communicating during the DL region and the UL region according to the timing relationship, wherein the timing relationship between the DL region and the UL region comprises a specified minimum time duration for performing same-subframe scheduling of hybrid automatic repeat request (HARQ) feedback for subframes having separate regions for UL and DL communications and is based at least in part on a serving cell that schedules communications during the subframe, and wherein a first duration of the DL region or a second duration of the UL region are based at least in part on the specified minimum time duration.

2. The method of claim 1, further comprising:
   identifying the additional region of the subframe, wherein the additional region comprises an additional DL region or an additional UL region.

3. The method of claim 2, wherein a transmission on resources of the additional region is based at least in part on a timing relationship between the DL region or the UL region and the additional region.

4. The method of claim 1, further comprising:
   receiving a DL control message during the DL region.

5. The method of claim 4, further comprising:
   receiving DL data during the DL region, wherein resources of the DL region are scheduled by the DL control message.

6. The method of claim 5, further comprising:
   transmitting an UL control message during the UL region, wherein the UL control message comprises acknowledgment (ACK) information for the DL data received during the DL region.

7. The method of claim 4, further comprising:
   receiving DL data during the additional region, wherein the additional region follows the DL region and precedes the UL region, and wherein the additional region comprises an additional DL region comprising resources scheduled by the DL control message.

8. The method of claim 7, further comprising:
   transmitting an UL control message during a subsequent subframe, wherein the UL control message comprises acknowledgment (ACK) information for the DL data received during the additional DL region.

9. The method of claim 4, further comprising:
   transmitting UL data or an UL control message, or both, during the UL region, wherein the resources of the UL region are scheduled by the DL control message.

10. The method of claim 4, further comprising:
    transmitting UL data or an UL control message, or both, during the additional region, wherein the additional region follows the DL region and precedes the UL region, and wherein the additional region comprises an additional UL region comprising resources scheduled by another DL control message in a preceding subframe.

11. The method of claim 1, wherein the timing relationship between the DL region and the UL region is based at least in part on a capability of a user equipment (UE) scheduled for communication during the subframe or a serving cell that schedules communications during the subframe, or both.

12. The method of claim 1, wherein the timing relationship between the DL region and the UL region is identified using a system information (SI) broadcast, radio resource control (RRC) signaling, or a grant of resources in a DL control message, or any combination thereof.

13. The method of claim 1, further comprising:
    identifying the guard region of the subframe, wherein the timing relationship between the DL region and the UL region is based at least in part on a location of the guard region within the subframe or a duration of the guard region, or both.

14. The method of claim 13, wherein the duration of the guard region of the subframe is different from a guard period of a special subframe of a time division duplex (TDD) configured carrier, wherein the TDD configured carrier comprises the subframe and the special subframe.

15. The method of claim 14, wherein the guard period of the special subframe is configured according to a common capability of each user equipment (UE) in a set of UEs within a system, and wherein the guard region of the subframe is configured according to a different capability of a subset of the set of UEs within the system.

16. The method of claim 1, wherein a DL HARQ timing or a UL scheduling timing, or both, for the subframe are different from a DL HARQ timing or a UL scheduling timing for a subsequent subframe or a preceding subframe.

17. The method of claim 1, further comprising:
    determining whether to transmit feedback on the resources of the UL region based at least in part on the timing relationship.

18. An apparatus for wireless communication comprising:
    means for identifying a downlink (DL) region of a subframe, wherein the subframe comprises the DL region, an uplink (UL) region, a guard region, and an additional region;
    means for identifying the UL region of the subframe, wherein a transmission on resources of the UL region is based at least in part on a timing relationship between the DL region and the UL region; and
    means for communicating during the DL region and the UL region according to the timing relationship, wherein the timing relationship between the DL region and the UL region comprises a specified minimum time duration for performing same-subframe scheduling of hybrid automatic repeat request (HARQ) feedback for subframes having separate regions for UL and DL communications and is based at least in part on a serving cell that schedules communications during the subframe, and wherein a first duration of the DL region or a second duration of the UL region are based at least in part on the specified minimum time duration.

19. An apparatus for wireless communication, comprising:
    a processor;
    memory in electronic communication with the processor; and
    instructions stored in the memory and operable, when executed by the processor, to cause the apparatus to:
        identify a downlink (DL) region of a subframe, wherein the subframe comprises the DL region, an uplink (UL) region, a guard region, and an additional region;
        identify the UL region of the subframe, wherein a transmission on resources of the UL region is based at least in part on a timing relationship between the DL region and the UL region; and communicate during the DL region and the UL region according to the timing relationship, wherein the timing relationship between the DL region and the UL region comprises a specified minimum time duration for performing same-subframe scheduling of hybrid automatic repeat request (HARQ) feedback for subframes having separate regions for UL and DL communications and is based at least in part on a serving cell that schedules communications during the subframe, and wherein a first duration of the DL region or a second duration of the UL region are based at least in part on the specified minimum time duration.

20. The apparatus of claim 19, wherein the instructions are further operable to cause the apparatus to:

identify the additional region of the subframe, wherein the additional region comprises an additional DL region or an additional UL region.

21. The apparatus of claim 19, wherein the instructions are further operable to cause the apparatus to:

receive a DL control message during the DL region.

22. The apparatus of claim 21, wherein the instructions are further operable to cause the apparatus to:

receive DL data during the DL region, wherein resources of the DL region are scheduled by the DL control message.

23. The apparatus of claim 22, wherein the instructions are further operable to cause the apparatus to:

transmit an UL control message during the UL region, wherein the UL control message comprises acknowledgment (ACK) information for the DL data received during the DL region.

24. The apparatus of claim 21, wherein the instructions are further operable to cause the apparatus to:

receive DL data during the additional region, wherein the additional region follows the DL region and precedes the UL region, and wherein the additional region comprises an additional DL region comprising resources scheduled by the DL control message.

25. The apparatus of claim 24, wherein the instructions are further operable to cause the apparatus to:

transmit an UL control message during a subsequent subframe, wherein the UL control message comprises acknowledgment (ACK) information for the DL data received during the additional DL region.

26. The apparatus of claim 21, wherein the instructions are further operable to cause the apparatus to:

transmit UL data or an UL control message, or both, during the UL region, wherein the resources of the UL region are scheduled by the DL control message.

27. The apparatus of claim 21, wherein the instructions are further operable to cause the apparatus to:

transmit UL data or an UL control message, or both, during the additional region, wherein the additional region follows the DL region and precedes the UL region, and wherein the additional region comprises an additional UL region comprising resources scheduled by another DL control message in a preceding subframe.

28. The apparatus of claim 19, wherein the timing relationship between the DL region and the UL region is based at least in part on a capability of a user equipment (UE) scheduled for communication during the subframe or a serving cell that schedules communications during the subframe, or both.

29. The apparatus of claim 19, wherein the instructions are further operable to cause the apparatus to:

identify the guard region of the subframe, wherein the timing relationship between the DL region and the UL region is based at least in part on a location of the guard region within the subframe or a duration of the guard region, or both.

30. A non-transitory computer-readable medium storing code for wireless communication, the code comprising instructions executable to:

identify a downlink (DL) region of a subframe, wherein the subframe comprises the DL region, an uplink (UL) region, a guard region, and an additional region;

identify the UL region of the subframe, wherein a transmission on resources of the UL region is based at least in part on a timing relationship between the DL region and the UL region; and communicate during the DL region and the UL region according to the timing relationship, wherein the timing relationship between the DL region and the UL region comprises a specified minimum time duration for performing same-subframe scheduling of hybrid automatic repeat request (HARQ) feedback used for subframes having separate regions for UL and DL communications and is based at least in part on a serving cell that schedules communications during the subframe, and wherein a first duration of the DL region or a second duration of the UL region are based at least in part on the specified minimum time duration.

* * * * *